United States Patent
Matsushita et al.

(10) Patent No.: US 9,335,865 B2
(45) Date of Patent: May 10, 2016

(54) COORDINATE INPUT APPARATUS, CONTROL METHOD THEREFOR, AND COMPUTER-READABLE MEDIUM

(71) Applicant: CANON KABUSHIKI KAISHA, Tokyo (JP)

(72) Inventors: Akihiro Matsushita, Tokyo (JP); Katsuyuki Kobayashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 141 days.

(21) Appl. No.: 13/973,651

(22) Filed: Aug. 22, 2013

(65) Prior Publication Data

US 2014/0062963 A1    Mar. 6, 2014

(30) Foreign Application Priority Data

Aug. 31, 2012  (JP) ................................. 2012-192299

(51) Int. Cl.
G06F 3/042   (2006.01)
G06F 3/041   (2006.01)

(52) U.S. Cl.
CPC ............ G06F 3/0421 (2013.01); G06F 3/0416 (2013.01)

(58) Field of Classification Search
CPC ................ G06F 3/0416; G06F 3/0418; G06F 3/042–3/0428
USPC ........................................................ 345/175
See application file for complete search history.

(56) References Cited

U.S. PATENT DOCUMENTS

| | | |
|---|---|---|
| 4,507,557 A | 3/1985 | Tsikos |
| 4,886,943 A | 12/1989 | Suzuki et al. |
| 4,887,245 A | 12/1989 | Mori et al. |
| 4,910,363 A | 3/1990 | Kobayashi et al. |
| 4,931,965 A | 6/1990 | Kaneko et al. |
| 4,980,518 A | 12/1990 | Kobayashi et al. |
| 5,070,325 A | 12/1991 | Tanaka et al. |
| 5,097,102 A | 3/1992 | Yoshimura et al. |
| 5,142,106 A | 8/1992 | Yoshimura et al. |
| 5,239,138 A | 8/1993 | Kobayashi et al. |
| 5,500,492 A | 3/1996 | Kobayashi et al. |
| 5,539,678 A | 7/1996 | Tanaka et al. |
| 5,565,893 A | 10/1996 | Sato et al. |
| 5,714,698 A | 2/1998 | Tokioka et al. |
| 5,726,686 A | 3/1998 | Taniishi et al. |

(Continued)

FOREIGN PATENT DOCUMENTS

| | | |
|---|---|---|
| JP | 2000-105671 A | 4/2000 |
| JP | 2001-043021 | 2/2001 |

(Continued)

OTHER PUBLICATIONS

U.S. Appl. No. 13/948,380 dated Jul. 23, 2013 by Ritsuo Machii et al.

(Continued)

*Primary Examiner* — Nathan Danielsen
(74) *Attorney, Agent, or Firm* — Fitzpatrick, Cella, Harper & Scinto

(57) ABSTRACT

Angle information indicating the direction in which one sensor unit of at least two sensor units is positioned is detected by directly receiving light from a light projecting unit of the other sensor unit at the light receiving unit of the one sensor unit. The coordinate values of the designated position are calculated based on the detected angle information.

14 Claims, 19 Drawing Sheets

(56) References Cited

U.S. PATENT DOCUMENTS

| | | | |
|---|---|---|---|
| 5,736,979 A | 4/1998 | Kobayashi et al. | |
| 5,805,147 A | 9/1998 | Tokioka et al. | |
| 5,818,429 A | 10/1998 | Tanaka et al. | |
| 5,831,603 A | 11/1998 | Yoshimura et al. | |
| 5,936,207 A | 8/1999 | Kobayashi et al. | |
| 6,335,724 B1 * | 1/2002 | Takekawa et al. | 345/173 |
| 6,415,240 B1 | 7/2002 | Kobayashi et al. | |
| 6,429,856 B1 | 8/2002 | Omura et al. | |
| 6,570,103 B1 | 5/2003 | Saka et al. | |
| 6,636,199 B2 | 10/2003 | Kobayashi | |
| 6,862,019 B2 | 3/2005 | Kobayashi et al. | |
| 7,075,524 B2 | 7/2006 | Kobayashi et al. | |
| 7,486,281 B2 | 2/2009 | Kobayashi et al. | |
| 7,538,894 B2 | 5/2009 | Kobayashi | |
| 7,965,904 B2 | 6/2011 | Kobayashi | |
| 8,982,102 B2 | 3/2015 | Takano et al. | |
| 2001/0019325 A1 | 9/2001 | Takekawa | |
| 2011/0157044 A1 * | 6/2011 | Yu | 345/173 |
| 2011/0164114 A1 | 7/2011 | Kobayashi et al. | |
| 2011/0304535 A1 | 12/2011 | Machii | |
| 2012/0065929 A1 * | 3/2012 | Yoshimura | 702/150 |
| 2012/0113057 A1 * | 5/2012 | Kobayashi | G06F 3/0421 345/175 |
| 2013/0234955 A1 | 9/2013 | Takano et al. | |
| 2013/0238124 A1 | 9/2013 | Suzuki et al. | |
| 2013/0257814 A1 | 10/2013 | Kobayashi et al. | |

FOREIGN PATENT DOCUMENTS

| | | |
|---|---|---|
| JP | 2001-142642 A | 5/2001 |
| JP | 2004-272353 | 9/2004 |
| JP | 4118664 B2 | 7/2008 |

OTHER PUBLICATIONS

U.S. Appl. No. 13/936,923, filed Jul. 8, 2013 by Kobayashi.

* cited by examiner

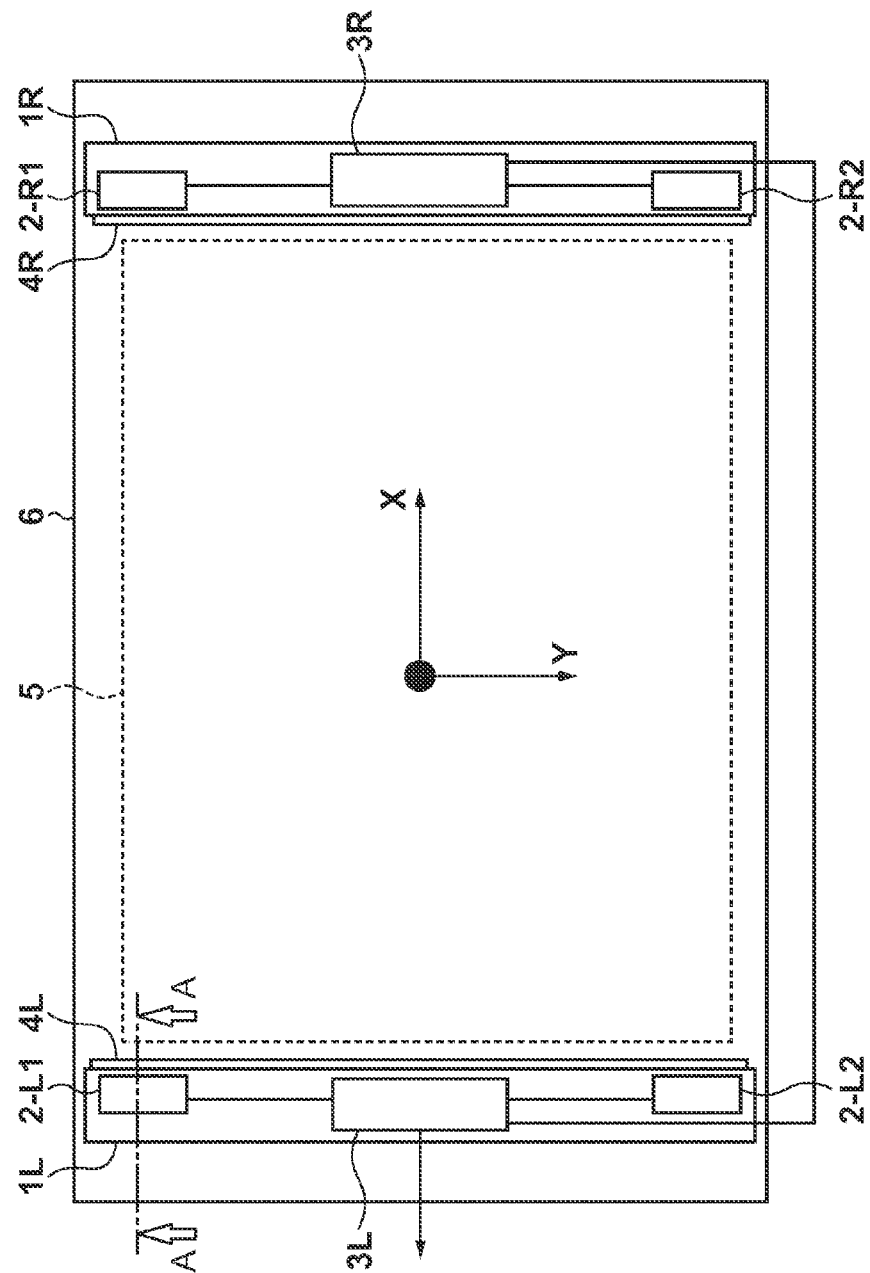

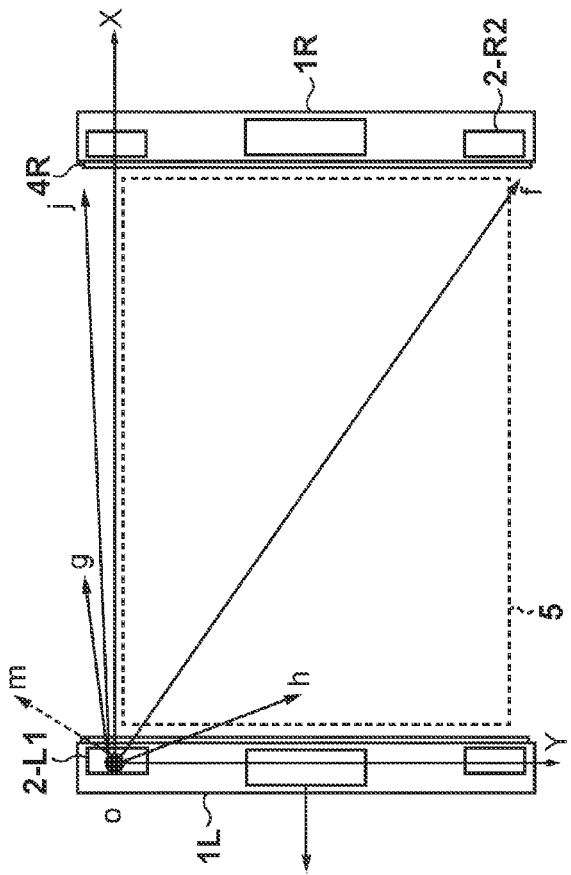
FIG. 3A
FIG. 3B
FIG. 3C
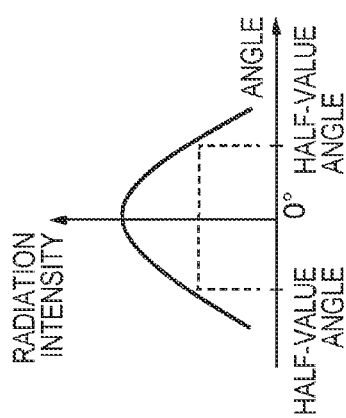
FIG. 3D

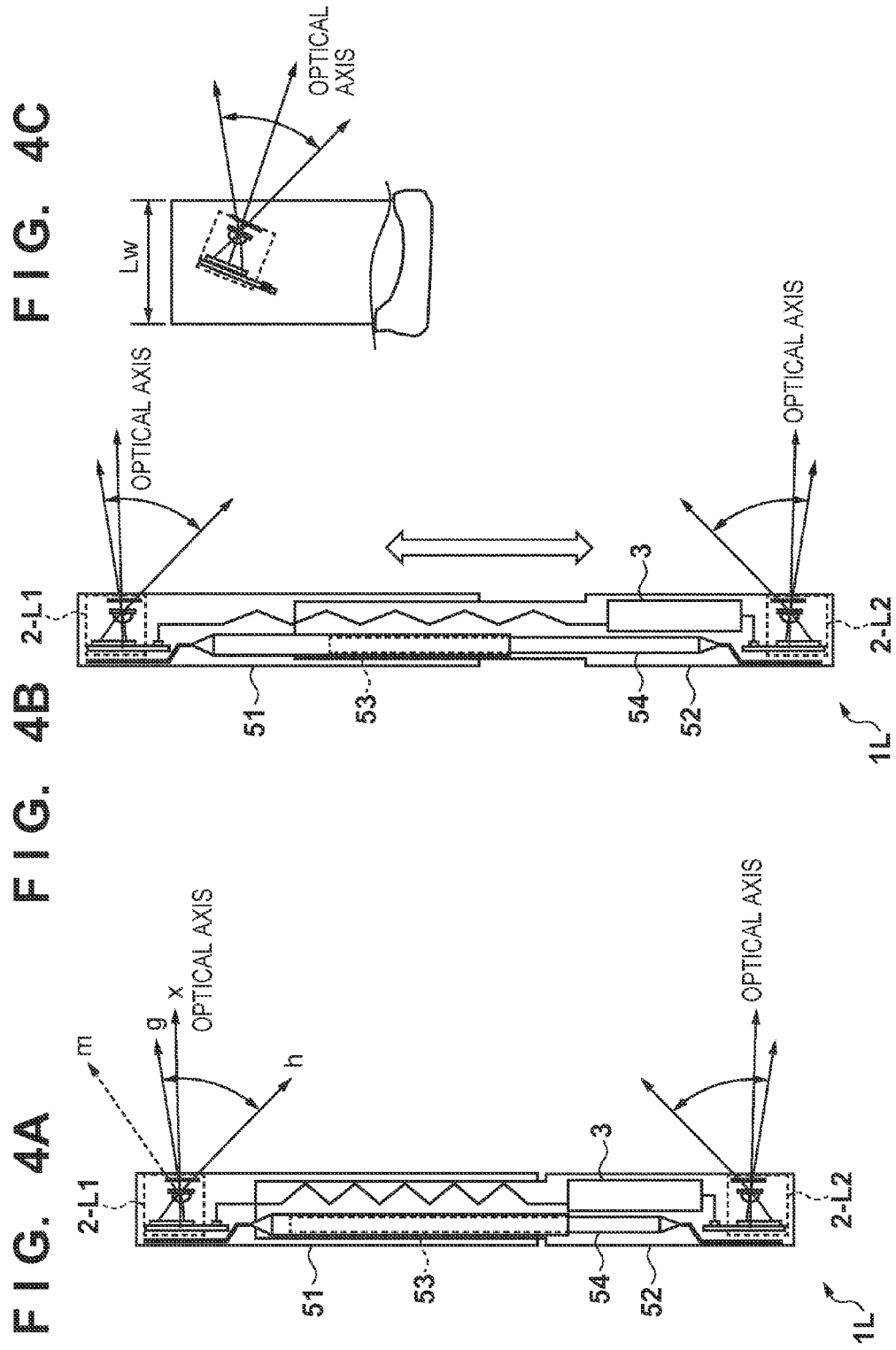

F I G. 7B 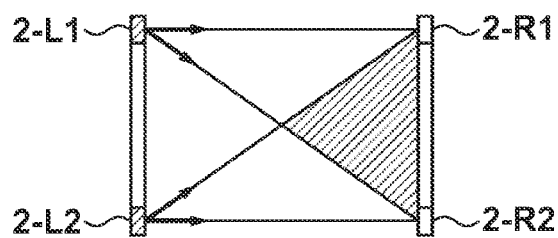
F I G. 7C 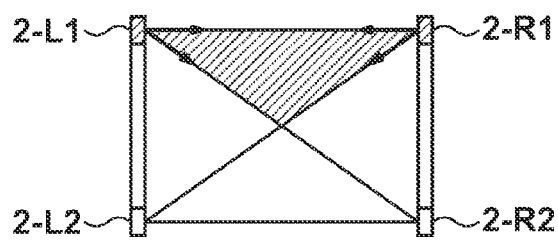
F I G. 7D 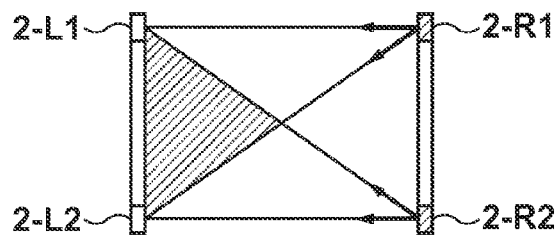
F I G. 7E 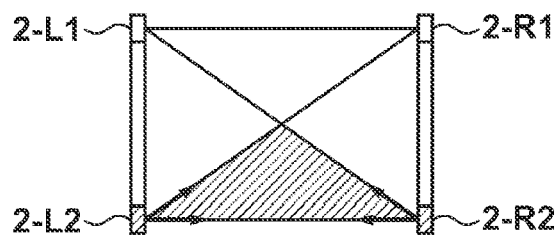
F I G. 7F 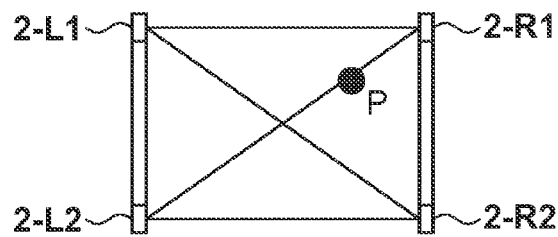

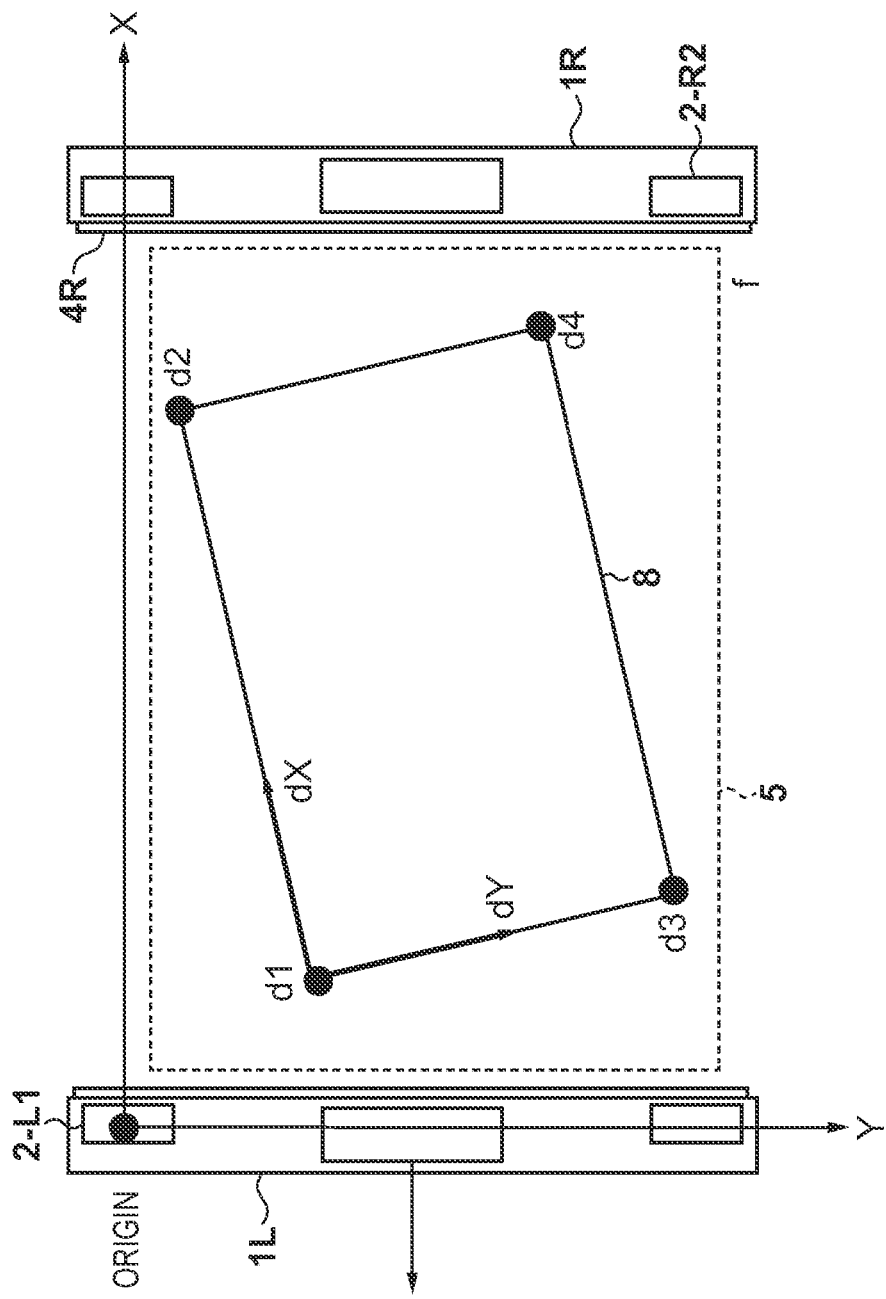

COORDINATE INPUT APPARATUS, CONTROL METHOD THEREFOR, AND COMPUTER-READABLE MEDIUM

BACKGROUND OF THE INVENTION

1. Field of the Invention

The present invention relates to a coordinate input apparatus which optically detects a coordinate position input to a coordinate input surface by a pointer such as a finger in order to input or select information. Particularly, the present invention relates to a detachable portable coordinate input apparatus.

2. Description of the Related Art

As such coordinate input apparatuses, various types of coordinate input apparatuses (touch panels and digitizers) have conventionally been proposed and commercialized. For example, a touch panel capable of easily operating a terminal such as a PC (Personal Computer) by touching the screen with a finger without using a special tool or the like is widely used.

Coordinate input methods range from a method using a resistive film to a method using an ultrasonic wave. As a method using light, there is known a method (light shielding method) of arranging a retroreflecting member outside a coordinate input surface, reflecting light from a light projecting unit by the retroreflecting member, and detecting the light amount distribution by a light receiving unit (see, for example, U.S. Pat. No. 4,507,557 and Japanese Patent Laid-Open No. 2004-272353). This method detects the direction of a light shielding portion (region) where light is cut off with a finger or the like in the coordinate input region, and determines the coordinates of the light shielding position, that is, coordinate input position.

FIG. 16 shows an arrangement as an example of generalizing the arrangement disclosed in the specification of U.S. Pat. No. 4,507,557. FIG. 16 shows sensor units 2L and 2R which are arranged at two ends of a coordinate input surface, and an effective coordinate input region 5 serving as a coordinate input surface used to input coordinates. A retroreflecting member 4 is arranged on three sides around the effective coordinate input region 5 to retroreflect incident light in the incident direction.

Each of the sensor units 2L and 2R includes a light projecting unit and light receiving unit (not shown). The light projecting unit projects light, which spreads in a fan-like shape almost parallelly to the input surface of the effective coordinate input region 5. The retroreflecting member 4 retroreflects the light, and the light receiving unit receives the return light. The coordinate input apparatus can calculate a touch position P input to the effective coordinate input region 5 based on the light shielding directions (light shielding angles θL and θR) of beams detected by the two sensor units 2L and 2R, and the distance between these sensor units.

As shown in FIG. 16, the field ranges of the sensor units 2L and 2R are symmetrically set by using the optical axis directions of the sensor units 2L and 2R as symmetry lines. In a coordinate input apparatus of this type using the lens optical system, if an angle formed with the optical axis increases, the optical performance always degrades under the influence of aberration. Employing a centered optical system can implement a higher-performance apparatus.

In FIG. 16, an arithmetic control circuit 3 controls the sensor units 2L and 2R, processes acquired output signals from the sensor units 2L and 2R, and outputs the processing result to an external apparatus.

Japanese Patent Laid-Open No. 2004-272353 exemplifies the detailed arrangements of the light projecting unit and light receiving unit of the sensor unit in the light shielding coordinate input apparatus disclosed in the specification of U.S. Pat. No. 4,507,557.

Further, Japanese Patent Laid-Open No. 2001-43021 discloses an arrangement which controls lighting of light projecting units in respective sensor units. More specifically, in Japanese Patent Laid-Open No. 2001-43021, it is controlled to alternately emit light from the light projecting units of the sensor units in order to prevent reception of light emitted by the light projecting unit of one sensor unit as disturbance light by the light receiving unit of the other sensor unit.

Further, Japanese Patent No. 4118664 discloses an arrangement in which a plurality of sensor units are arranged on two facing sides of an effective coordinate input region, and form a gap between a retroreflecting member and a coordinate input surface.

Integrating a coordinate input apparatus of this type with a display apparatus makes it possible to control the display state by touching the display screen of the display apparatus, or display the locus of a touch position as handwriting as in the relationship between paper and a pencil.

As the display apparatus, flat panel displays and front projectors of various types such as a liquid crystal display are known. For the flat panel display, the above-mentioned operational environment can be implemented by superimposing a coordinate input apparatus on it. A mobile device such as a smartphone is a typical example of this. Along with upsizing of flat panel displays, it is becoming popular to combine the flat panel display with a large-size touch panel and introduce it into, for example, the digital signage field.

For the front projector capable of a large-size display, a position detection unit is assembled into a screen board or the like serving as its projection surface, and an image is projected onto the screen board. The size of the coordinate input apparatus depends on that of the screen board serving as a touch operation surface, and the apparatus becomes relatively large. In general, therefore, a stand for moving the screen board is attached to the screen board, or the screen board is fixed to the wall and used. A larger-size front projector exponentially raises the sales price, seriously inhibiting the spread of a large-size coordinate input apparatus and an application using it.

In the light shielding coordinate input apparatus shown in FIG. 16, the sensor units 2, arithmetic control circuit 3, and retroreflecting member 4 are main components and attached to the screen board. Even if the apparatus becomes large, the arrangement of the main components remains unchanged, and the cost of the material of the screen board occupies most part of the cost rise caused by upsizing.

A user interface operated by touching the display screen of a display apparatus is intuitive and usable by everyone and has gone mainstream in mobile devices now. Such an operation is requested of even an apparatus having a larger display screen.

Detailed applications of a large screen are mainly requested from markets such as ICT education in the classroom and digital signage as a presentation function at a meeting and a whiteboard function. To meet this demand, the introduction cost for implementing the operational environment needs to be greatly reduced.

In most current meeting rooms and classrooms, whiteboards and front projectors have already been introduced as equipment. The present invention has as its object to provide an operational environment capable of a touch operation at low cost even for a large screen by effectively using such apparatuses already purchased by the user.

As described above, the main building components of the light shielding coordinate input apparatus are at least two sensor units 2 which detect directions in which the optical path is cut off by a touch operation, the arithmetic control circuit 3, and the retroreflecting member 4. If these main building components can be attached to, for example, a whiteboard at predetermined positions and sizes, a touch position on the whiteboard can be detected. Using an existing whiteboard as the screen board can omit, from indispensable building components, the screen board itself which occupies most of the cost. This can greatly suppress the product price and provide a touch operation environment at low cost even for a large screen.

The position detection principle of the light shielding coordinate input apparatus geometrically calculates a touch position based on light shielding directions (=angles) of the touch position output from at least two sensor units, and distance information between these sensor units. To detect a touch position at high accuracy, the sensor units need to be positioned and attached at high accuracy. It is more preferable that the user can easily attach these sensor units.

In contrast, even rough positioning and attachment of the sensor units by the user can implement the following usage if high-accuracy touch position detection is possible. More specifically, only the main building components of the light shielding coordinate input apparatus are carried, and used by easily attaching them within a short time to a whiteboard installed in a meeting room where a meeting is held. After the end of the meeting, the main building components are detached and carried back, or carried to another meeting room and used there. In short, a detachable portable coordinate input apparatus can be operated by "everybody" at any time "anywhere" "easily". The number of building components of a product itself for implementing this is preferably small. Further, the product is compact and lightweight for portability.

Since the main building components can be attached and detached, they can be attached to, for example, an already purchased whiteboard by using magnets. Using the whiteboard as the projection surface can provide an input/output integrated touch operation environment. In general, whiteboards of various sizes are commercially available. By using a larger-size whiteboard, an image can be projected onto a larger display surface, needless to say. It is preferable that the main building components can be set in accordance with various sizes of whiteboards installed in meeting rooms and can detect a touch position at high accuracy.

The conventional optical coordinate input apparatus adopts a scheme of detecting a touch position in accordance with the principle of triangulation based on pieces of angle information output from at least two angle detection sensors, and the distance between the two angle detection sensors. Therefore, to use the conventional apparatus as a coordinate input apparatus, the distance between the two angle detection sensors must be known.

However, whiteboards owned by the user as projection surfaces have various sizes, so display images corresponding to these sizes are projected. As shown in FIG. 16, two angle detection sensors are arranged near the corners of a display region, but the regions where these sensors are set must be ensured on the whiteboards.

It is therefore preferable to appropriately change the distance between the angle detection sensors in accordance with the shape or size of the whiteboard or projection surface owned by the user. To detect a touch position, the distance between the sensors set by the user must be measured using some kind of method, thus requiring, for example, a distance measurement sensor for this measurement. This inevitably increases the cost.

SUMMARY OF THE INVENTION

The present invention provides a coordinate input apparatus which can control a display screen by touching a projection surface formed by an existing whiteboard or the wall surface of, for example, a meeting room with an inexpensive arrangement.

In order to achieve the above-mentioned object, a coordinate input apparatus according to the present invention includes the following arrangement. That is, a coordinate input apparatus which detects a designated position in a coordinate input effective region, the apparatus comprises: at least two sensor units each of which includes a light projecting unit configured to project light toward the coordinate input effective region, and a light receiving unit configured to receive incoming light; a detection unit configured to detect angle information indicating a direction in which one sensor unit of the at least two sensor units is positioned, by directly receiving light from the light projecting unit of the other sensor unit at the light receiving unit of the one sensor unit; and a coordinate calculation unit configured to calculate coordinate values of the designated position based on the angle information detected by the detection unit.

According to the present invention, it is possible to provide a coordinate input apparatus which can control a display screen by touching a projection surface formed by an existing whiteboard or the wall surface of, for example, a meeting room with an inexpensive arrangement.

Further features of the present invention will become apparent from the following description of exemplary embodiments with reference to the attached drawings.

BRIEF DESCRIPTION OF THE DRAWINGS

FIG. 1 is a view showing the schematic arrangement of a coordinate input apparatus according to the first embodiment;

FIG. 3A is a view for explaining the field ranges of a light projecting unit and light receiving unit according to the first embodiment;

FIG. 3B is a view for explaining the field ranges of the light projecting unit and light receiving unit according to the first embodiment;

FIG. 3C is a view for explaining the field ranges of the light projecting unit and light receiving unit according to the first embodiment;

FIG. 3D is a view for explaining the field ranges of the light projecting unit and light receiving unit according to the first embodiment;

FIG. 4A is a view showing the schematic arrangement of a sensor bar according to the first embodiment;

FIG. 4B is a view showing the schematic arrangement of the sensor bar according to the first embodiment;

FIG. 4C is a view showing the schematic arrangement of the sensor bar according to the first embodiment;

FIG. 7B is a view for explaining coordinate calculation according to the first embodiment;

FIG. 7C is a view for explaining coordinate calculation according to the first embodiment;

FIG. 7D is a view for explaining coordinate calculation according to the first embodiment;

FIG. 7E is a view for explaining coordinate calculation according to the first embodiment;

FIG. 7F is a view for explaining coordinate calculation according to the first embodiment;

FIG. 8 is a view for explaining a relative coordinate system and display coordinate system according to the first embodiment;

DESCRIPTION OF THE EMBODIMENTS

Figure 2A:
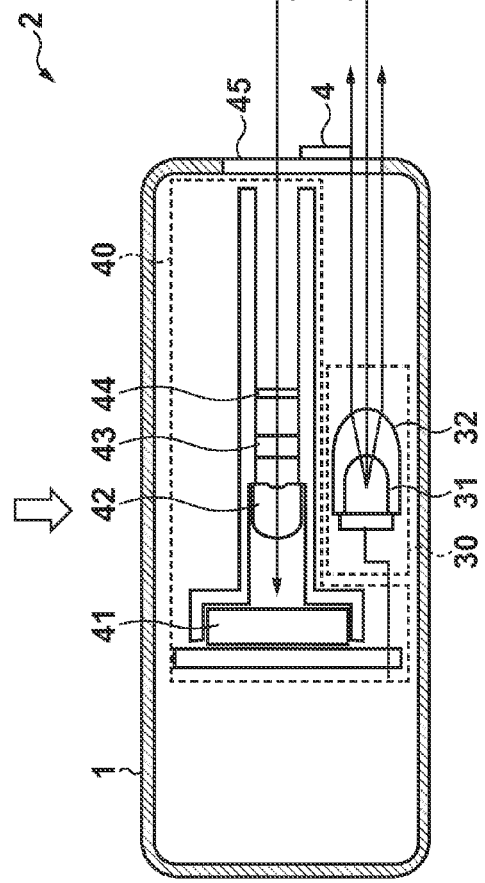
FIG. 2A is a view showing the detailed arrangement of a sensor unit according to the first embodiment.

Embodiments of the present invention will now be described in detail with reference to the accompanying drawings. Note that arrangements set forth in the following embodiments are merely examples, and the present invention is not limited to illustrated arrangements.

<First Embodiment>

The schematic arrangement of a coordinate input apparatus according to the first embodiment will be described with reference to FIG. 1.

In FIG. 1, reference numeral 1L denotes a sensor bar serving as a housing which stores sensor units 2-L1 and 2-L2 (first and second sensor units) serving as at least two angle detection sensor units. Also, reference numeral 1R denotes a sensor bar serving as a housing which stores sensor units 2-R1 and 2-R2 (third and fourth sensor units).

Each of the sensor bars 1L and 1R (to be generically referred to as sensor bars 1) is positioned on two sides facing a rectangular effective coordinate input region 5, as shown in FIG. 1. If a display apparatus is a front projector, a display region is set within the range of the effective coordinate input region 5, and projected onto, for example, a flat whiteboard 6. As a matter of course, the present invention is not limited to the whiteboard 6, and a wall surface, for example, may be used.

As shown in FIG. 1, the retroreflecting members 4L and 4R (to be generically referred to as retroreflecting members 4) are mounted on the side surfaces of the sensor bars 1L and 1R, respectively. The retroreflecting members 4L and 4R are configured to retroreflect infrared light projected from the sensor unit of the sensor bar 1R or 1L arranged on each of facing sides.

The sensor bar 1L incorporates sensor units 2-L1 and 2-L2, and the sensor bar 1R incorporates sensor units 2-R1 and 2-R2. An arithmetic control circuit 3L incorporated in the sensor bar 1L controls the sensor units 2-L1 and 2-L2, performs arithmetic processing for the output results, and controls an arithmetic control circuit 3R of the sensor bar 1R. The arithmetic control circuit 3R of the sensor bar 1R controls the sensor units 2-R1 and 2-R2, performs arithmetic processing for the output results, and transmits the results to the arithmetic control circuit 3L of the sensor bar 1L. The arithmetic control circuit 3L of the sensor bar 1L processes output results from the four sensor units 2-L1, 2-L2, 2-R1, and 2-R2, calculates a touch position, and outputs the results to an external device such as a personal computer.

Although an arrangement (that is, wired connection) which connects the arithmetic control circuit 3L of the sensor bar 1L and the arithmetic control circuit 3R of the sensor bar 1R to each other is used in FIG. 1, the present invention is not limited to this. Communication functions such as radio transmission may be implemented to perform data transmission/reception (wireless connection) using these communication functions.

In the following description, the horizontal direction will be referred to as the X-axis (the right side of FIG. 1 is the positive side), and the vertical direction will be referred to as the Y-axis (the lower side is the positive side).

Figure 2C:
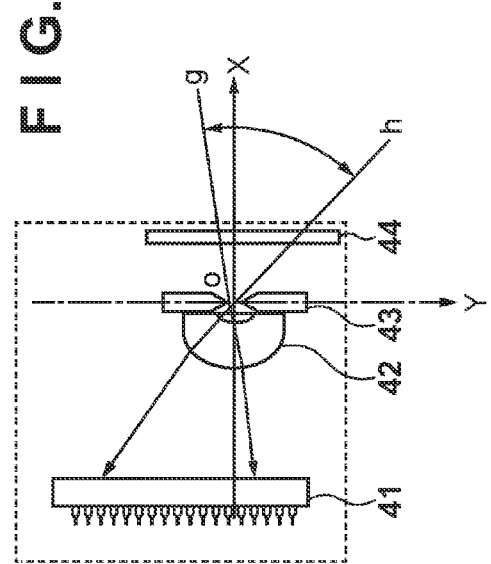
FIG. 2C is a view showing the detailed arrangement of the sensor unit according to the first embodiment.
Figure 2B:
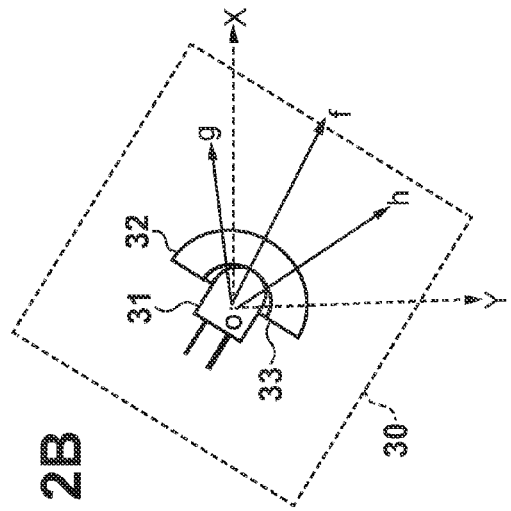
FIG. 2B is a view showing the detailed arrangement of the sensor unit according to the first embodiment.

FIGS. 2A to 2C are views showing the detailed arrangement of the sensor units 2-L1, 2-L2, 2-R1, and 2-R2 (to be generically referred to as the sensor units 2 hereinafter). FIG. 2A is a sectional view taken along a cross-section A-A in FIG. 1, and FIGS. 2B and 2C are front views when viewed from directions indicated by arrows in FIGS. 2B and 2C.

In FIG. 2A, the sensor unit 2 is stored in the sensor bar 1 and formed from a light projecting unit 30 which projects light toward the effective coordinate input region 5, and a light receiving unit 40 which receives incoming light. The distance between the light projecting unit 30 and the light receiving unit 40 is L_pd, and the retroreflecting member 4 is interposed between them as shown in FIG. 2A. Reference numeral 45 denotes a light transparent member 45 serving as a protection member for preventing entrance of a foreign substance such as dust into the sensor bar 1.

In FIG. 2B, the light projecting unit 30 includes an infrared LED 31 serving as a light emitting unit, a projection lens 32, and an adhesion layer 33 for fixing them. The projection lens 32 is configured to change light from the infrared LED 31 into a beam almost parallel to the whiteboard 6 serving as the coordinate input surface. The light projecting unit 30 emits a fan-like beam having a vertex at the position of a point O (the barycentric position of the sensor unit 2) in a light projecting range of g to h so as to illuminate the entire region of the retroreflecting member 4 of the sensor bar 1 arranged on a facing side. At this time, the optical axis of the light projecting unit 30 is set in the direction f, the reason of which will be described later.

In FIG. 2C, the light receiving unit 40 detects light which has been projected by the light projecting unit 30 and retroreflected by the retroreflecting member 4 mounted in the sensor bar 1 arranged on a facing side. Reference numeral 41 denotes a line CCD serving as a photoelectric converter; 42, a light receiving lens; 43, a field stop; and 44, an infrared pass filter. The infrared pass filter 44 may be omitted by giving the infrared pass filter function to the protection member 45.

The optical axis of the light receiving unit 40 is set in the X-axis direction. The field range is a range of g to h, and the position of the point O serves as an optical center position. As shown in FIG. 2C, the light receiving unit 40 is an optical system asymmetric to the optical axis. The light projecting unit 30 and light receiving unit 40 are arranged to overlap each other, as shown in FIG. 2A, so that the positions of the points O, the directions g, and the directions h substantially coincide with each other. Since the light receiving unit 40 condenses light to a pixel of the line CCD 41 in accordance with the direction of incident light, the pixel number of the line CCD 41 represents angle information of incident light.

Also, the light receiving unit 40 has a field range almost parallel to the coordinate input surface of the effective coordinate input region 5, and its optical axis direction is set to coincide with the normal direction of the light receiving surface of the line CCD 41.

FIG. 3A is a view showing the schematic arrangement of the coordinate input apparatus and the arrangement of the optical system of the light projecting unit 30 and light receiving unit 40. The range in which the light projecting unit 30 of the sensor bar 1L projects light toward the retroreflecting member 4R mounted on the sensor bar 1R arranged on a facing side is a range of g to h. Light in a direction in a range of j to f in which the retroreflecting member 4R is actually mounted is retroreflected and detected by the light receiving unit 40.

Beams of light projected by the light projecting unit 30 schematically shown in FIG. 2A do not become completely parallel, and as the light projecting distance increases, the beam width increases. Hence, the amount of light retroreflected by the retroreflecting member 4R decreases as the distance to the retroreflecting member 4R increases. Thus, the retroreflection efficiency becomes poor in the direction f in which the distance from the light projecting point O to the retroreflecting member 4R is long, compared to the direction j in which the distance is short.

Further, the retroreflection efficiency of the retroreflecting member 4R decreases as the incident angle increases, compared to a case in which light hits the retroreflecting surface perpendicularly. In other words, the ratio at which light reaching the retroreflecting member 4R is retroreflected as retroreflected light depends on the incident angle, and the direction f is a direction in which the retroreflection efficiency becomes lowest.

The optical axis of the light receiving unit 40 is set in the direction X, and the direction f is a direction in which an angle formed with the optical axis becomes largest. It is known that the lens characteristic of a general optical lens degrades the performance as an angle formed with the optical axis becomes larger. Owing to a decrease in light collection efficiency in the direction f, this direction is a direction in which light becomes darkest.

From this, even if the light projecting unit 30 can project light at a predetermined intensity regardless of the direction, retroreflected light detectable by the light receiving unit 40 becomes weak as the direction changes from the direction j toward the direction f, compared to retroreflected light returned from the direction j (see FIG. 3B).

In contrast, the infrared LED 31 is generally configured to maximize the radiation intensity of light in the optical axis direction. As an angle formed with the optical axis increases, the radiation intensity decreases. In general, the degree of decrease is defined by an angle "half-value angle" at which the radiation intensity becomes half the illumination intensity in the optical axis direction (see FIG. 3C).

Considering this, the optical axis of the light projecting unit 30 is pointed in the direction f in which the retroreflected light level is lowest. This increases the illumination intensity in the direction f, and decreases the illumination intensity as the direction relatively changes from the direction f to the direction j. Since the intensity of detectable retroreflected light can be uniformed between the directions j and f (see FIG. 3D), a more stable signal can be obtained regardless of the direction.

In the first embodiment, based on the radiation intensity distribution of the infrared LED 31, the optical axis of the light projecting unit 30 is pointed in the direction f in which the retroreflected light level is lowest. However, the angle of inclination of the light projecting unit 30 with respect to the light receiving unit 40 is not limited to this. For example, when an optical system in which the optical axis of the projection lens 32 itself becomes asymmetric is mounted, the light amount distribution and the radiation intensity distribution in FIG. 3C also become asymmetric. In this case, the angle of inclination of the light projecting unit 30 with respect to the light receiving unit 40 may be set so that a direction in which the asymmetric distribution becomes maximum coincides with the direction f.

Details of the arrangement of the sensor bar 1L will be explained with reference to FIGS. 4A to 4C. Although the sensor bar 1L receives attention and is explained with reference to FIGS. 4A to 4C, the sensor bar 1R also has the same arrangement.

As described above, a purpose of the apparatus is to attach the two sensor bars 1L and 1R to, for example, a flat whiteboard or wall surface so that the user can directly touch and operate a display screen projected on the whiteboard or wall surface. The size of the display screen is arbitrarily set by the user in accordance with the size of the whiteboard or that of the wall surface, and is not a fixed value. Further, whiteboards of various sizes are commercially available, and standard sizes capable of projecting a large screen as the projection screen are dimensions of 900×1,200 mm, 900×1,800 mm, and 1,200×1,800 mm.

However, these dimensions do not define ranges effectively used as the whiteboard, and are often dimensions containing the housing frame around the four sides of the whiteboard 6. An actually usable flat region is smaller, and its size varies depending on the manufacturer under the present circumstances.

To cope with this, in the coordinate input apparatus according to the first embodiment, a stretching/contraction mechanism (a stretching/contraction unit which stretches/contracts in the direction of a line segment that connects the centers of gravity of the two sensor units) is arranged in the sensor bar 1. With this arrangement, the length of the sensor bar 1, in other words, the distance (and the length of the retroreflecting member 4) between the sensors of the two sensor units 2 incorporated in the sensor bar 1 is changeable. In practice, an arrangement (position change unit) which can change the outer length of the sensor bar 1 from 820 mm to 1,200 mm is used so that the sensor bar 1 can be attached to a flat portion having a size of 820 mm to 1,200 mm in a whiteboard having a vertical dimension of 900 mm to 1,200 mm.

In FIG. 1, the stretching/contraction amount is set based on the vertical dimension of the whiteboard on the assumption that the sensor bars are attached at two, left and right portions to the whiteboard. However, the present invention is not limited to this. For example, assuming that the sensor bars are attached not at two, left and right portions but at two, upper and lower portions to the whiteboard, the maximum dimension of the sensor bar 1 upon stretching is set to be longer. Further, assuming that the sensor bars are used even for a larger screen projected on a wall surface or the like, the stretching/contraction amount of the sensor bar is set in accordance with the size of an assumed maximum display screen.

In the first embodiment, when the sensor bars are assumed to be attached to a whiteboard, attaching the sensor bars at left and right portions is considered to be superior to attaching them at upper and lower portions.

As the first reason, considering the aspect ratio of the display apparatus and that of the whiteboard, when a maximum display region is set on the whiteboard, blank portions (regions where nothing is displayed) are generated in the left and right regions of the whiteboard. Hence, setting the sensor bars 1 at the blank portions can prevent a problem that the sensor bars 1 downsize a display image. In other words, an operational environment capable of using a larger screen can be provided.

The second reason is as follows. Generally, the display screen is horizontally elongated at an aspect ratio of 16:9 or the like. To enable a touch operation in a region equal to the display screen, the sensor units according to the first embodiment need to be arranged at the corners of the display screen. Thus, arranging the sensor bars 1 at left and right portions on the display screen can suppress the lengths of the sensor bars 1, compared to arranging them at upper and lower portions.

One purpose of the coordinate input apparatus according to the first embodiment is to carry it to a meeting room or the like of the user's choice, and quickly use it by using a whiteboard already installed in the meeting room or the wall surface of the meeting room. For this purpose, the sensor bars 1 are made compact and lightweight and attached at left and right portions at which the lengths of the sensor bars 1 can be suppressed.

The third reason is that left-and-right attachment facilitates installation. In other words, in upper-and-lower attachment, if the display screen becomes large, the user needs to prepare a stepladder or the like and do high-place work to attach the sensor bar 1 on the upper side. Depending on the display size, the upper-and-lower attachment sometimes makes installation difficult.

FIG. 4A shows the schematic arrangement of the sensor bar 1. The sensor bar 1 is formed from an upper housing 51 and lower housing 52. Reference numeral 53 denotes an outer pipe; and 54, an inner pipe. The inner diameter of the outer pipe 53 and the outer diameter of the inner pipe 54 substantially fit with each other. The outer pipe 53 is fixed to the upper housing 51, and the inner pipe 54 is fixed to the lower housing 52. When the length of the sensor bar 1 is increased or decreased by the upper housing 51 and lower housing 52, the outer pipe 53 and inner pipe 54 slide while keeping fitting with each other (see FIG. 4B). In the present invention, these pipes are made of a metal to obtain the stretching/contraction direction and mechanical strength of the sensor bar 1 in the stretching/contraction operation. One end of the metal pipe is drawn and crushed. At this portion, the pipe is mechanically coupled to the housing, and the sensor unit 2 is mounted.

In the first embodiment, the optical axis of the light receiving unit 40 of the sensor unit 2 is arranged in a direction perpendicular to the stretching/contraction direction of the sensor bar 1. As described above, the field range of the light receiving unit 40 is set to be asymmetric to the optical axis. With this arrangement, the housing of the sensor bar 1 can be formed to be thin. This is because the longitudinal direction of the line CCD 41 and that of a circuit board (not shown) serving as a mounting surface on which the line CCD 41 is mounted coincide with the longitudinal direction of the sensor bar 1, and the line CCD 41 and circuit board are arranged efficiently. Also, the mounting surface on which the line CCD 41 serving as a photoelectric conversion device is mounted is almost perpendicular to the effective coordinate input region 5.

FIG. 4C exemplifies a light projecting unit which employs a conventional centered optical system. To ensure a field range necessary for the light receiving unit 40, the optical axis of the optical system of the light receiving unit 40 has to be inclined with respect to the sliding direction of the sensor bar. As a result, the width Lw of the sensor bar 1 which stores the optical system becomes larger than the width of the sensor bar 1 in the embodiment of the present invention. This upsizes the housing, increases the weight, impairs portability, and increases the area necessary for mounting the sensor bar. Thus, attaching the sensor bar to a whiteboard or the like reduces the projection area of the display apparatus.

A case in which a centered optical system is used, the optical system of the light receiving unit 40 is set in a direction perpendicular to the sliding direction of the sensor bar 1, and the optical system deflects a beam to ensure a necessary field range in FIG. 4C will be examined. Since new optical elements such as a mirror are inserted in the optical path, the sensor unit 2 inevitably becomes large. Even in this arrangement, the width Lw of the sensor bar 1 increases, compared to the use of a decentered optical system in the present invention.

Further, a case in which a field range of ±50° centered on the optical system (for example, optical axis) of the light receiving unit 40 having a sufficiently large field range is employed will be examined. In FIG. 3A, the field range of the light receiving optical system is a range of the direction h to the direction m, and has an angle Xoh=angle Xom=50° with respect to the optical axis direction X. A field range necessary for the coordinate input apparatus according to the first embodiment is only a range (range of the direction f to the direction j) which covers the entire region of the retroreflecting member 4 arranged on a facing side. For this reason, almost the half field range on one side (range of the direction j to the direction m) becomes an ineffective region. Even in this case, the effective field range of the light receiving unit 40 is equal to a field range obtained when a substantially decentered optical system is adopted.

Figure 5A:
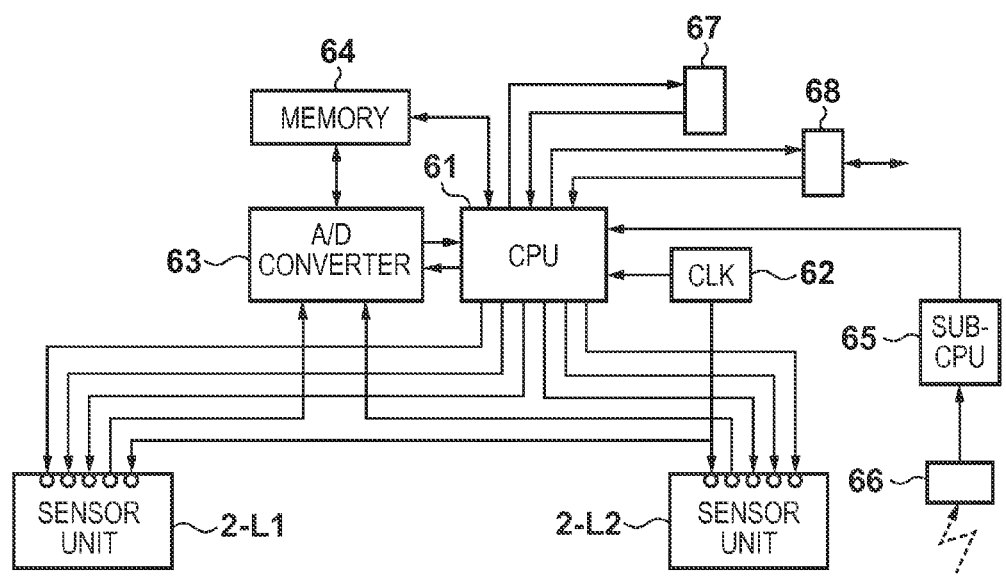
FIG. 5A is a block diagram for explaining the operation of an arithmetic control circuit in a first detection mode according to the first embodiment.

FIG. 5A is a block diagram showing the arithmetic control circuit 3. The arithmetic control circuit 3L of the sensor bar 1L and the arithmetic control circuit 3R of the sensor bar 1R in the embodiment have the same circuit arrangement except for an external interface specification, and perform control of the corresponding connected sensor units 2 and arithmetic processing. FIG. 5A particularly shows the arrangement of the arithmetic control circuit 3L of the sensor bar 1L.

A CPU 61 formed from a one-chip microcomputer or the like outputs CCD control signals for the line CCDs 41 of the sensor units 2-L1 and 2-L2, and performs control of the shutter timings and data output of the line CCDs 41, and the like. CCD clocks are transmitted from a clock generator CLK 62 to the sensor units 2-L1 and 2-L2, and also input to the CPU 61 in order to perform various control operations in synchronism with the line CCDs 41. Note that the CPU 61 supplies LED driving signals for driving the infrared LEDs 31 of the sensor units 2-L1 and 2-L2.

An A/D converter 63 receives detection signals from the line CCDs 41 of the sensor units 2-L1 and 2-L2, and converts them into digital values under the control of the CPU 61. A memory 64 stores the converted digital values to use them for angle calculation. A geometric touch position is calculated from the calculated angle information, and output to an information processing apparatus such as an external PC via an interface 68 (for example, a USB interface).

As described above, the arithmetic control circuit 3 of each sensor bar 1 controls the two sensor units 2. When the arithmetic control circuit 3L of the sensor bar 1L serves as the main function, the CPU 61 transmits a control signal to the arithmetic control circuit 3R of the sensor bar 1R via a serial communication unit 67 to synchronize the circuits. Then, the CPU 61 acquires necessary data from the arithmetic control circuit 3R.

The operation between the arithmetic control circuits 3L and 3R is executed by master-slave control. In the first embodiment, the arithmetic control circuit 3L serves as the master, and the arithmetic control circuit 3R serves as the slave. Note that each arithmetic control circuit can become either the master or slave, and a switching unit such as a DIP switch (not shown) can switch the arithmetic control circuit between the master and the slave by inputting a switching signal to the CPU port.

To acquire data from the sensor units 2-R1 and 2-R2 of the sensor bar 1R arranged on a facing side, the arithmetic control circuit 3L of the sensor bar 1L serving as the master transmits a control signal to the arithmetic control circuit 3R serving as the slave via the serial communication unit 67. Angle information obtained by the sensor units 2-R1 and 2-R2 is calculated and transmitted to the arithmetic control circuit 3L serving as the master via the serial communication unit 67.

In the first embodiment, the interface 68 is mounted on the arithmetic control circuit 3L serving as the master. An infrared receiving unit 66 is a pointer when a special-purpose pen (not shown) for emitting an infrared ray is used. A sub-CPU 65 decodes a signal from the special-purpose pen. The special-purpose pen includes a switch which detects pressing of the input surface by the pen tip, and various switches arranged on the side of the pen housing. The operation state of the special-purpose pen can be detected by transmitting the states of these switches and pen identification information from an infrared emitting unit arranged in the special-purpose pen.

Figure 5B:
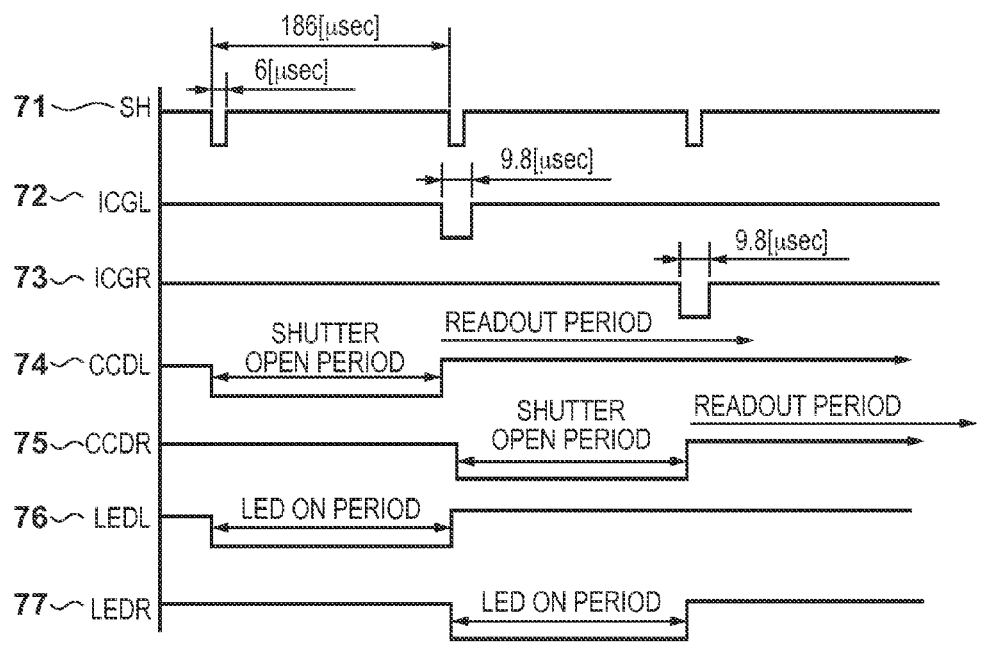
FIG. 5B is a timing chart for explaining the operation of the arithmetic control circuit in the first detection mode according to the first embodiment.

FIG. 5B is a timing chart showing control signals output from the CPU 61 of the arithmetic control circuit 3L serving as the master to operate the sensor unit 2, and the operation of the sensor unit 2.

Reference numerals 71, 72, and 73 denote control signals for controlling the line CCD 41. The interval of the SH signal 71 determines the shutter open time of the line CCD 41. The ICGL signal 72 is a gate signal to the sensor units 2-L1 and 2-L2 of the sensor bar 1L, and is a signal for transferring charges in the photoelectric converter of the line CCD 41 to a readout unit.

A CCDL signal 74 is a signal representing the shutter open time of the line CCDs 41 of the sensor units 2-L1 and 2-L2. The ICGR signal 73 is a gate signal to the sensor units 2-R1 and 2-R2 of the facing sensor bar 1R, and is transmitted to the arithmetic control circuit 3R of the sensor bar 1R via the serial communication unit 67. Then, the arithmetic control circuit 3R generates a signal for transferring charges in the photoelectric converter of the line CCD 41 to the readout unit. A CCDR signal 75 is a signal representing the shutter open time of the line CCDs 41 of the sensor units 2-R1 and 2-R2.

An LEDL signal 76 and LEDR signal 77 are driving signals for the infrared LEDs 31 of the sensor units 2. To turn on the infrared LEDs 31 of the sensor units 2-L1 and 2-L2 of the sensor bar 1L in the first cycle of the SH signal 71, the LEDL signal 76 is supplied to the infrared LEDs 31 via LED driving circuits (not shown).

To turn on the infrared LEDs 31 of the sensor units 2-R1 and 2-R2 of the sensor bar 1R arranged on a facing side in the next cycle of the SH signal 71, the LEDR signal 77 is supplied to the arithmetic control circuit 3R via the serial communication unit 67. Then, the arithmetic control circuit 3R generates a signal to be supplied to the LED driving circuits.

After the end of driving the infrared LED 31 and opening the shutter of the line CCD 41, a signal from the line CCD 41 is read out from the sensor unit 2, and angle information is calculated by a method to be described later. The arithmetic result of the arithmetic control circuit 3R serving as the slave is transmitted to the arithmetic control circuit 3L serving as the master.

By the above-described operation, the sensor units 2-L1 and 2-L2 of the sensor bar 1L and the sensor units 2-R1 and 2-R2 of the facing sensor bar 1R operate at different timings. With this arrangement, only retroreflected light of light emitted by the sensor unit itself can be detected without detecting infrared light of the sensor unit arranged on a facing side.

Figure 6A:
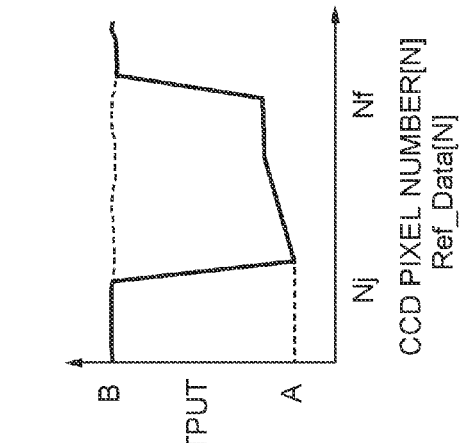
FIG. 6A is a graph for explaining processing of a detection signal waveform according to the first embodiment.
Figure 6B:
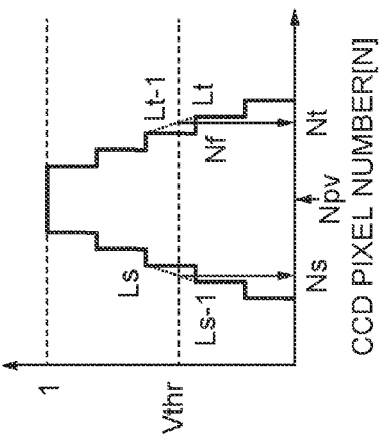
FIG. 6B is a graph for explaining processing of the detection signal waveform according to the first embodiment.

A signal output from the sensor unit 2 of the sensor bar 1 will be explained with reference to FIGS. 6A to 6D. FIG. 6A shows an output from the light receiving unit 40 when the light projecting unit 30 of the sensor unit 2 does not emit light. FIG. 6B shows an output from the light receiving unit 40 when the light projecting unit 30 of the sensor unit 2 emits light. In FIG. 6B, a level A is the maximum level of a detected light amount, and a level B is a level at which no light is detected (received).

An infrared ray emitted by the sensor unit 2 is retroreflected by the retroreflecting member 4 arranged on a facing side, and detected by the sensor unit 2 itself. The direction of a pixel number Nj at which an optical output starts to be obtained is the direction j in FIG. 3A. Similarly, the direction of a pixel number Nf is the direction f in FIG. 3A. The light amount from the pixel number Nj to the pixel number Nf changes depending on the size or aspect ratio of the display screen, a corresponding arrangement state (especially the distance between the two sensor bars 1) and stretching/contraction state of the sensor bar 1, and the like.

To obtain an optimum light amount level, the coordinate input apparatus according to the first embodiment controls the SH signal to adjust the shutter open time of the line CCD 41 and the exposure time of the infrared LED 31. The time can be set to be short if a light amount obtained from the sensor unit 2 is large, and long if it is small. Further, a current to be supplied to the infrared LED 31 may be adjusted depending on a detected light amount level. The coordinate input apparatus is configured to obtain an optimum light amount by monitoring an output signal in this manner. This adjustment may be performed, as needed, when the level varies. Alternatively, when the sensor bar 1 is set and holds the state, the light amount may be adjusted upon power-on after the completion of installation because a stable predetermined signal should be obtained.

Referring back to FIGS. 6A to 6D, when the user touches the input surface of the effective coordinate input region 5 and cuts off the optical path, no light amount can be detected at, for example, the pixel number Nc, as shown in FIG. 6C. In the first embodiment, a direction in which the input surface has been touched, that is, an angle is calculated using signals in FIGS. 6A to 6C.

First, reference data is acquired upon activation of the system, upon reset of the system, or automatically. Although data processing of one sensor unit 2 will be explained below, the remaining sensor units also perform the same processing.

Upon power-on, while the operator does not perform a touch operation and the illumination by the light projecting unit 30 is OFF, the A/D converter 63 A/D-converts an output from the line CCD 41, and the memory 64 stores the value as Base_Data[N]. This data contains variations of the bias of the line CCD 41 and is data around the level B in FIG. 6A. [N] is the CCD pixel number of the line CCD 41, and a pixel number corresponding to the effective input range is used.

Similarly, a light amount distribution in a state in which the operator does not perform a touch operation and the illumination by the light projecting unit 30 is ON is acquired and stored. This data is data indicated by a solid line in FIG. 6B, and is stored as Ref_Data[N] in the memory 64. The storage of these two types of data are managed as initial data.

After that, sampling starts. If no touch operation is performed, the data shown in FIG. 6B is obtained. If a touch operation is performed, data shown in FIG. 6C in which a shadow C has been detected in accordance with the touch position is detected. The sample data obtained when the illumination by the light projecting unit 30 is ON is defined as Norm_Data[N].

By using these data (Base_Data[N] and Ref_Data[N] stored in the memory 64), the presence/absence of an input from the pointer and the presence/absence of a light shielding portion are determined. First, to specify a light shielding portion, the absolute amount of a change of data is calculated in each pixel and compared with a preset threshold Vtha:

$$Norm\_Data0[N]=Norm\_Data[N]-Ref\_Data[N] \quad (1)$$

where Norm_Data0[N] is the absolute change amount in each pixel. By comparison with the threshold, a determination error caused by noise or the like is prevented, and a reliable change of a predetermined amount is detected. If data exceeding the threshold is generated in, for example, a predetermined number or more of successive pixels, it is determined that a touch operation has been performed. Since this processing only calculates a difference and compares it, the calculation can be executed within a short time and the presence/absence of an input can be determined quickly.

Then, for higher-accuracy detection, the change ratio of pixel data is calculated, and an input point is determined using equation (2):

$$Norm\_DataR[N]=Norm\_Data0[N]/(Base\_Data[N]-Ref\_Data[N]) \quad (2)$$

For this pixel data (light amount distribution), a separately set threshold Vthr is applied. Then, the angle is calculated by obtaining, as a pixel corresponding to the input from the pointer, the center between pixel numbers at the leading edge and trailing edge of a light amount variation region corresponding to the light shielding portion in the light amount distribution, which correspond to points crossing the threshold Vthr.

Figure 6C:
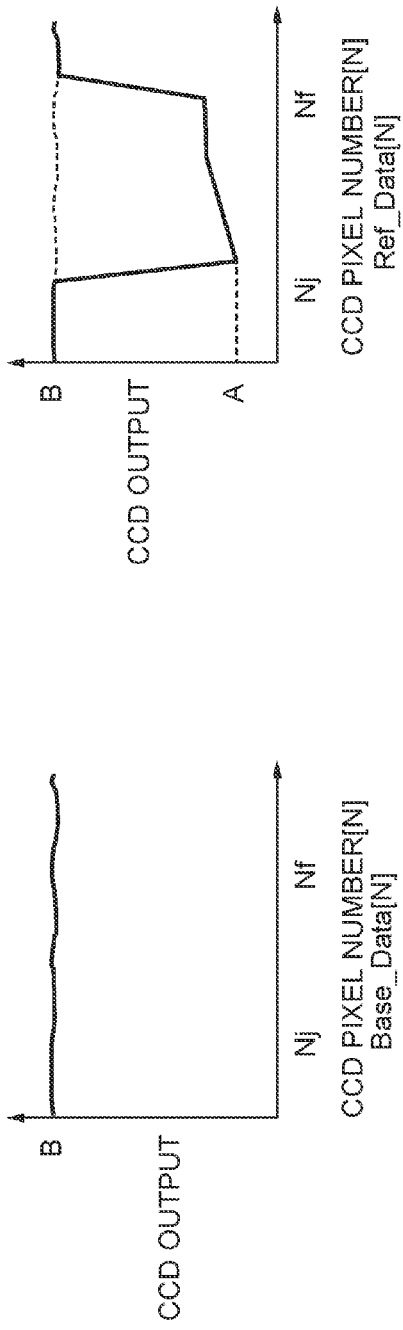
FIG. 6C is a graph for explaining processing of the detection signal waveform according to the first embodiment.
Figure 6D:
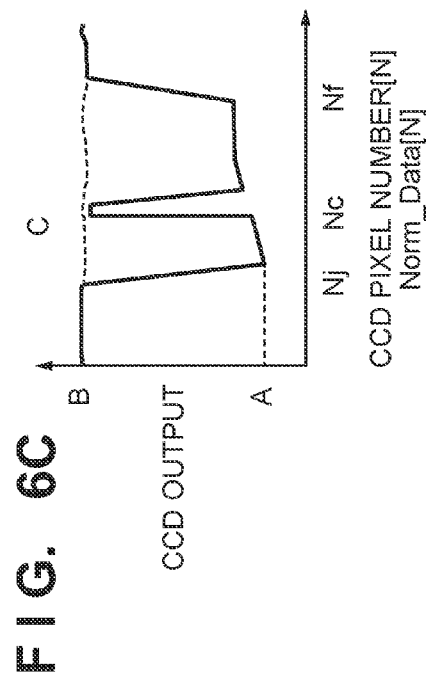
FIG. 6D is a graph for explaining processing of the detection signal waveform according to the first embodiment.

FIG. 6D exemplifies a detection result after the end of calculating the change ratio. Assume that the threshold Vthr is used for detection, and the leading edge of the light shielding portion reaches a level Ls in the Ns-th pixel and exceeds the threshold Vthr. Further, assume that the pixel data reaches a level Lt in the Nt-th pixel and becomes lower than the threshold Vthr.

At this time, calculation may be performed by setting, as the center value between pixel numbers at the leading edge and the trailing edge, the pixel number Np of the line CCD 41 that should be output, as represented by equation (3):

$$Np=Ns+(Nt-Ns)/2 \quad (3)$$

In this case, the pixel interval of the line CCD 41 serves as the resolution of the output pixel number.

For higher-resolution detection, a virtual pixel number at which the threshold Vthr is crossed is calculated using the data level of each pixel and that of an immediately preceding adjacent pixel.

Letting Ls be the level of the pixel Ns, Ls–1 be that of the pixel Ns–1, Lt be that of the pixel Nt, and Lt–1 be that of the pixel Nt–1, virtual pixel numbers Nsv and Ntv can be calculated as $$Nsv=Ns-1+(Vthr-Ls-1)/(Ls-Ls-1) \quad (4)$$

$$Ntv=Nt-1+(Vthr-Lt-1)/(Lt-Lt-1) \quad (5)$$

According to these calculation equations, virtual pixel numbers corresponding to the output level, that is, pixel numbers finer than those of the line CCD 41 can be acquired. A virtual center pixel Npv between the virtual pixel numbers Nsv and Ntv is determined by equation (6):

$$Npv=Nsv+(Ntv-Nsv)/2 \quad (6)$$

In this fashion, higher-resolution detection can be implemented by calculating virtual pixel numbers crossing the threshold Vthr of the predetermined level from the pixel numbers of pixels of data levels crossing the threshold Vthr, adjacent pixel numbers, and their data levels.

To calculate the actual coordinate value of the pointer from the thus-obtained center pixel number, the center pixel number needs to be converted into angle information.

In actual coordinate calculation to be described later, it is more convenient to calculate not an angle itself but a tangent value at this angle. Note that a pixel number is converted into tan θ by looking up a table or using a conversion. When a high-order polynomial is used as the conversion, the accuracy can be ensured. However, it suffices to determine the order and the like in consideration of the calculation ability, accuracy, and the like.

The use of a fifth-order polynomial will be exemplified. When the fifth-order polynomial is used, six coefficients are necessary, and these coefficient data are stored in a memory such as a nonvolatile memory in shipment or the like. Letting L5, L4, L3, L2, L1, and L0 be the coefficients of the fifth-order polynomial, tan θ can be expressed by $$\tan \theta=((((L5*Npr+L4)*Npr+L3)*Npr+L2)*Npr+L1)*Npr+L0 \quad (7)$$

By executing the same processing for the respective sensor units, respective angle data can be determined. Although tan θ is calculated in the above example, angle data itself may be calculated and then tan θ may be calculated.

Figure 7A:
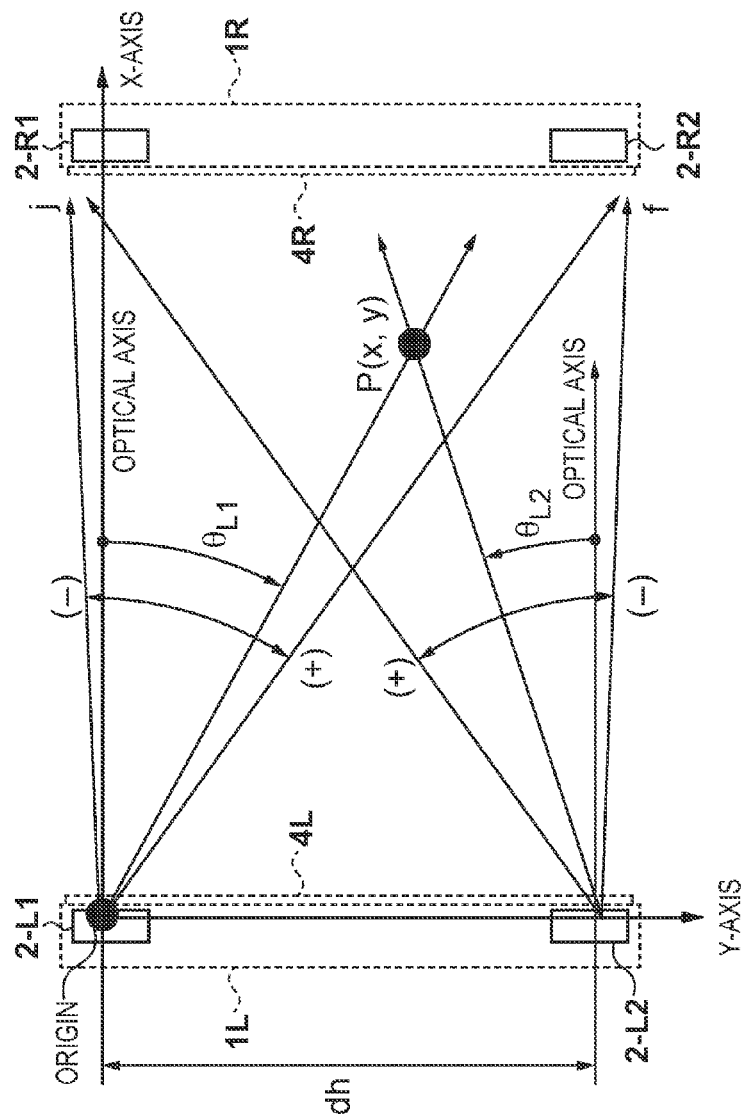
FIG. 7A is a view for explaining coordinate calculation according to the first embodiment.

FIGS. 7A to 7F are views showing a positional relationship with screen coordinates. The field range of the sensor unit 2-L1 of the sensor bar 1L is a range of the direction j to the direction f, and the sign of the angle is set as shown in FIG. 7A. The optical axis of the sensor unit 2-L1 is the X-axis direction, and its direction is defined as an angle of 0°. Similarly, the field range of the sensor unit 2-L2 is a range of the direction f to the direction j, the sign of the angle is set as shown in FIG. 7A, and the optical axis direction of the sensor unit 2-L2 is defined as an angle of 0°. A line segment connecting the center of the optical axis of the sensor unit 2-L1 and that of the optical axis of the sensor unit 2-L2 is defined as the Y-axis. Then, the optical axis of each sensor unit serves as the normal direction of the line segment. Also, the distance between the center of the optical axis of the sensor unit 2-L1 and that of the optical axis of the sensor unit 2-L2 is defined as dh.

Assume that a touch operation is performed at the position of a point P.

An angle calculated by the sensor unit 2-L1 is θL1, and an angle calculated by the sensor unit 2-L2 is θL2. The coordinates of the touch position P can be geometrically calculated using these two pieces of angle information and the distance dh:

$$x = dh \cdot \tan(\pi/2 - \theta L2) \cdot \tan(\pi/2 - \theta L1)/(\tan(\pi/2 - \theta L2) + \tan(\pi/2 - \theta L1)) \quad (8)$$

$$y = dh \cdot \tan(\pi/2 - \theta L2) \cdot \tan(\pi/2 - \theta L2)/(\tan(\pi/2 - \theta L1) \quad (9)$$

Even if an output from one sensor unit is θL1=0 or θL2=0, the touch position can be geometrically easily calculated based on angle information output from the other sensor unit.

Although the above description assumes that the distance dh between the two sensor units is known, position detection can be done even when the distance dh changes due to stretching/contraction of the sensor bar and the distance dh is unknown. The distance dh is known for the sake of simplicity, but an arrangement capable of position detection even if the distance dh is unknown will be described later.

The touch position can be calculated only when the touch position P exists in a hatched range in FIG. 7B out of the field ranges of the sensor units 2-L1 and 2-L2. When no touch position exists in this range, a touch position in the entire effective coordinate input region 5 can be detected by changing a combination of sensor units used for calculation, as shown in FIGS. 7C, 7D, and 7E. Therefore, sensor units necessary for coordinate calculation are selected based on the presence/absence of a light shielding direction detected by each sensor unit 2 and the light shielding direction, and the touch position is calculated. Then, the parameters in equations (8) and (9) are changed in accordance with a combination of the selected sensor units 2, and coordinate conversion is performed.

As shown in FIG. 7F, the touch position P may exist near a sensor unit selection boundary region. In this case, the touch position can be calculated by a combination of sensor units in the state of FIG. 7B or 7C. As a detailed arrangement, for example, the field range of the sensor unit 2-L2 and that of the sensor unit 2-R1 overlap each other in the diagonal direction of the effective coordinate input region 5. When the user touches the overlapping region, coordinates can be calculated by a plurality of sensor unit combinations. In this case, the average value of coordinate values calculated by a combination of sensor units may be output as determined coordinates.

The thus-calculated coordinate value is the value of the first coordinate system of the coordinate input apparatus (to be referred to as the relative coordinate system of the coordinate input apparatus hereinafter) according to the first embodiment, and the effective region where position calculation is possible is the effective coordinate input region 5 in FIG. 3A. The display surface of the display is set within the range of the effective coordinate input region 5. If the display is a front projector, a display region 8 serving as a projected image is set in the effective coordinate input region 5, as shown in FIG. 8. In FIG. 8, the display region has the second coordinate system (to be referred to as a display coordinate system hereinafter) serving as a display coordinate system which has an origin dl and is defined by the dX axis and dY axis. To perform a tap operation for an icon or the like by directly touching a displayed image, the relative coordinate system and display coordinate system need to be correlated.

To obtain the correlation, dedicated application software is generally installed in a personal computer (PC) which performs display control. When the application is activated, a cross or the like is displayed on the display screen to prompt the user to touch the cross position. The coordinate system is converted so that a coordinate value in the relative coordinate system that is obtained by repeating this operation at different positions by a predetermined number of times, and a coordinate value in the display coordinate system at the position where the cross is displayed coincide with each other.

The coordinate input apparatus according to the first embodiment performs this coordinate conversion by prompting the user to touch the four corners of the display screen, instead of displaying a cross position by using the application software and prompting the user to touch it. This arrangement has a great effect of quickly using the coordinate input apparatus by connecting it to an on-site PC without installing special software. Especially, the coordinate input apparatus according to the present invention is greatly advantageous because it is portable and is installed in a meeting room by carrying the sensor bars 1 without carrying a PC together. The coordinate input apparatus according to the first embodiment has a great effect of using it immediately upon completion of easy installation using a PC and display apparatus at a place to which the coordinate input apparatus has been carried.

Transition to the mode in which these coordinate systems are made to coincide with each other is performed by, for example, a mode transition switch (not shown) arranged on the sensor bar 1. Upon mode transition by the mode transition switch, an output unit such as a loudspeaker incorporated in the sensor bar 1 gives guidance to sequentially touch the four corners. Every time the corner is touched, a buzzer sound may be output to represent the completion of the input. Alternatively, an indicator incorporated in the sensor bar 1 may prompt the operation.

In coordinate calculation in the relative coordinate system, the distance dh between the sensor units 2 used in calculation of equations (8) and (9) needs to be known in advance. However, in a use form as shown in FIG. 8 in which the coordinate input apparatus is used in combination with the display apparatus, the distance dh need not always be known in advance. More specifically, information about the four corners representing a display size is sequentially acquired as angle information in each sensor unit in the relative coordinate system by a touch operation. As a result, the coordinates of a touch position in the display coordinate system can be calculated by only ratio-based calculation.

The coordinate input apparatus according to the first embodiment assumes that the user attaches the two sensor bars 1 to display screens of various display sizes. After the two sensor bars have a relative positional relationship in FIG. 7A (the two sensor bars are parallel and have the same length, and the sensor unit of the other sensor bar is arranged in the X-axis direction), high-accuracy position detection in the relative coordinate system becomes possible. Although a mechanism which sets the two sensor bars 1 in this arrangement may be adopted, the user is forced to do careful installation work. If the user can easily attach the two sensor bars at a rough estimate, this improves convenience and greatly shortens the installation time. For higher convenience, therefore, the first embodiment employs the second detection mode as a coordinate detection mode.

Figure 9A:
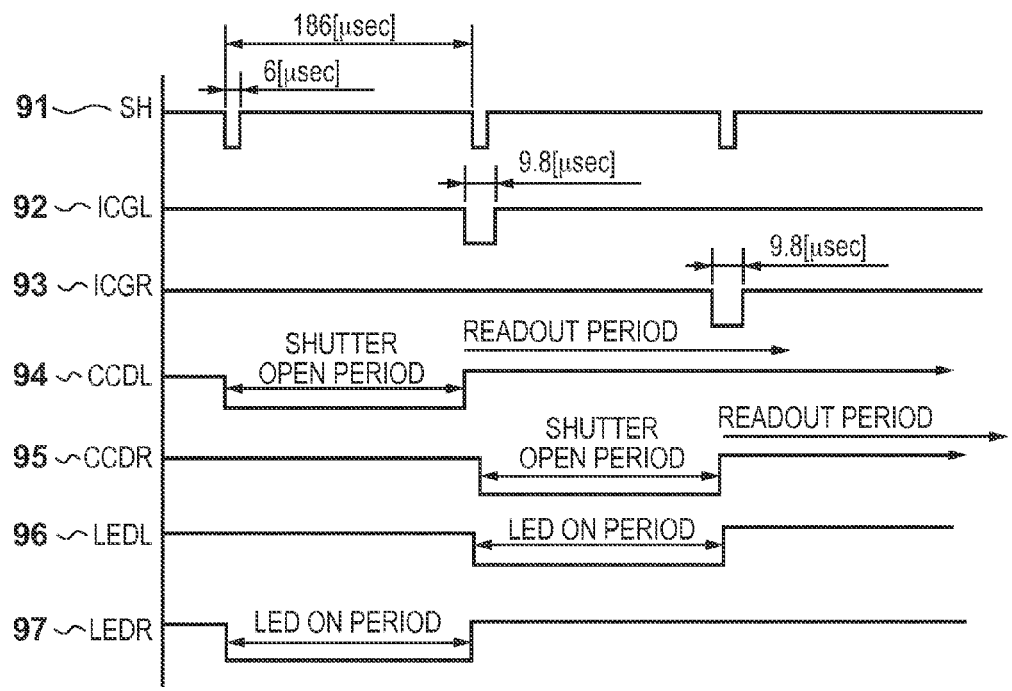
FIG. 9A is a timing chart for explaining the operation of the arithmetic control circuit in the second detection mode according to the first embodiment.

FIG. 9A is a timing chart showing control signals output from the CPU 61 of the sensor bar 1L serving as the master, and the operation of the sensor unit 2 in order to explain the second detection mode.

Reference numerals 91, 92, and 93 denote control signals for controlling the line CCD 41. The interval of the SH signal 91 determines the shutter open time of the line CCD 41. The ICGL signal 92 is a gate signal to the sensor units 2-L1 and 2-L2 of the sensor bar 1L, and is a signal for transferring charges in the photoelectric converter of the line CCD 41 to a readout unit.

A CCDL signal 94 is a signal representing the shutter open time of the line CCDs 41 of the sensor units 2-L1 and 2-L2. The ICGR signal 93 is a gate signal to the sensor units 2-R1 and 2-R2 of the facing sensor bar 1R, and is transmitted to the arithmetic control circuit 3R of the sensor bar 1R via the serial communication unit 67. Then, the arithmetic control circuit 3R generates a signal for transferring charges in the photoelectric converter of the line CCD 41 to the readout unit. A CCDR signal 95 is a signal representing the shutter open time of the line CCDs 41 of the sensor units 2-R1 and 2-R2.

An LEDL signal 96 and LEDR signal 97 are driving signals for the infrared LEDs 31 of the sensor units 2. To turn on the infrared LEDs 31 of the sensor units 2-R1 and 2-R2 of the sensor bar 1R in the first cycle of the SH signal 91, the LEDR signal 97 is transmitted to the arithmetic control circuit 3R of the sensor bar 1R via the serial communication unit 67. Then, the arithmetic control circuit 3R generates a signal to be supplied to the LED driving circuits.

To turn on the infrared LEDs 31 of the sensor units 2-L1 and 2-L2 of the sensor bar 1L in the next cycle of the SH signal 91, the LEDL signal 96 is supplied to the infrared LEDs 31 via the LED driving circuits.

After the end of driving the infrared LED 31 and opening the shutter of the line CCD 41, a signal from the line CCD 41 is read out from the sensor unit 2, and angle information is calculated by a method to be described later. The arithmetic result of the arithmetic control circuit 3R serving as the slave is transmitted to the arithmetic control circuit 3L serving as the master.

By the above-described operation, the sensor units 2-L1 and 2-L2 of the sensor bar 1L directly detect infrared light emitted by the infrared LEDs 31 of the sensor units 2-R1 and 2-R2 of the facing sensor bar 1R. Similarly, the sensor units 2-R1 and 2-R2 of the sensor bar 1R directly detect infrared light emitted by the infrared LEDs 31 of the sensor units 2-L1 and 2-L2 of the facing sensor bar 1L.

Note that FIGS. 5A and 5B show a coordinate detection mode in which the sensor units 2-L1 and 2-L2 of the sensor bar 1L and the sensor units 2-R1 and 2-R2 of the facing sensor bar 1R operate at different timings. This coordinate detection mode is the first detection mode.

Figure 9B:
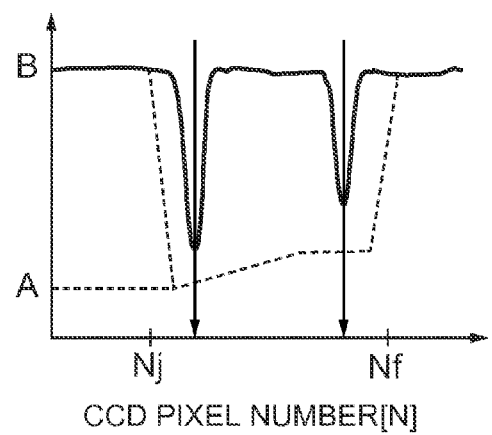
FIG. 9B is a timing chart for explaining the operation of the arithmetic control circuit in the second detection mode according to the first embodiment.

FIG. 9B shows a detection signal waveform obtained by the sensor unit 2 when the coordinate input apparatus operates in the second detection mode. Beams emitted by the light projecting units 30 of the two sensor units 2 arranged on facing sides are received, so two peak signals are generated.

The respective directions are calculated by the same method as the above-described angle calculation method. In FIG. 9B, a broken line indicates an output (light amount distribution) from the light receiving unit 40 shown in FIG. 6B, and represents that peak signals are generated between the direction Nj and the direction Nf.

One purpose of the first embodiment is to implement high-accuracy position detection even when the user attaches the two sensor bars 1 at a rough estimate, as described above. To achieve this, each sensor unit 2 detects light from the light projecting unit 30 of the sensor unit 2 stored in the facing sensor bar 1, thereby detecting a direction in which the facing sensor unit 2 is positioned.

This state will be explained with reference to FIG. 10A.

Figure 10A:
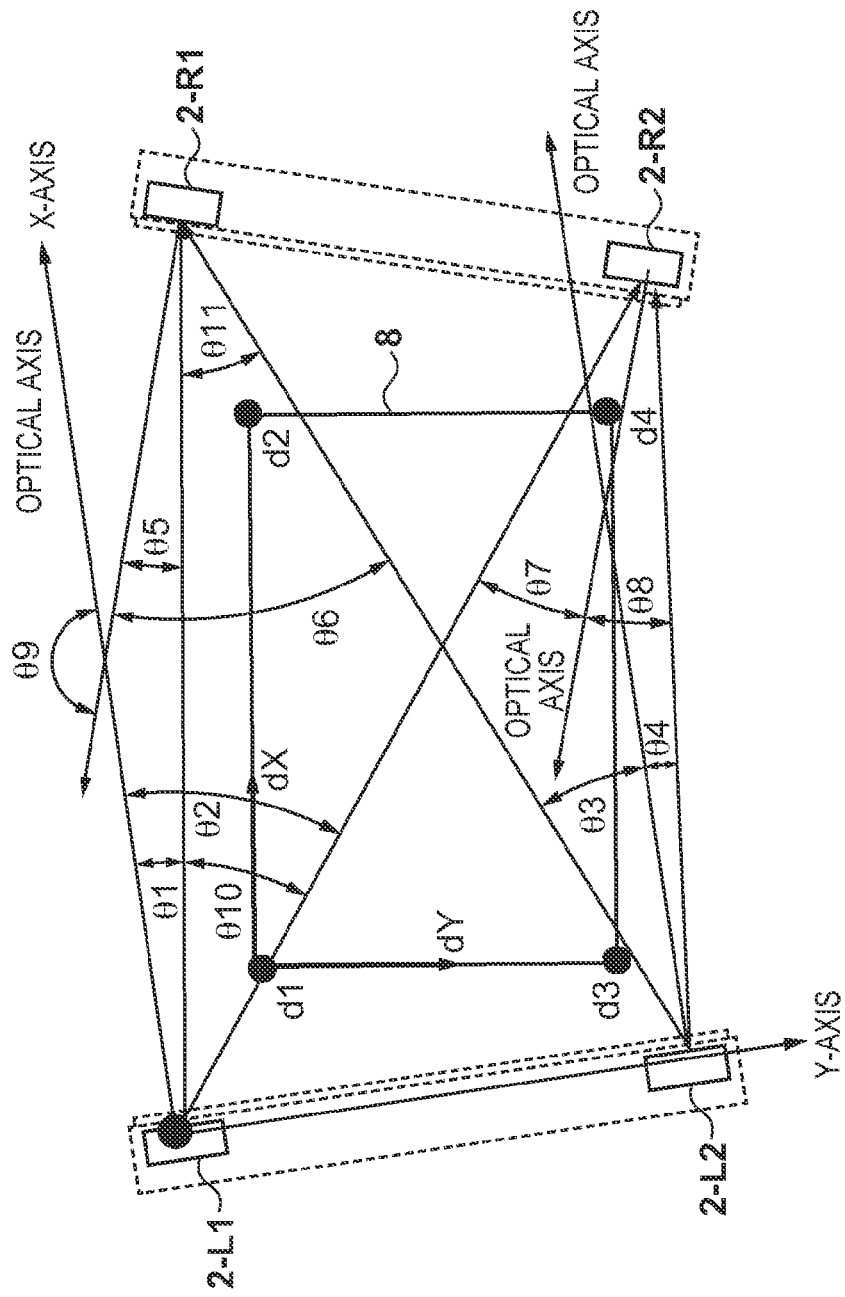
FIG. 10A is a view for explaining calculation of the relative positional relationship between the sensor units according to the first embodiment.

In FIG. 10A, a line segment connecting the center of the optical axis of the sensor unit 2-L1 and that of the optical axis of the sensor unit 2-L2 is defined as the Y-axis, and the normal direction is defined as the X-axis. The optical axes of the sensor units 2-L1 and 2-L2 are parallel to the X-axis. The facing sensor unit 2-R1 is positioned in a direction at an angle θ1 when viewed from the sensor unit 2-L1, and a direction at an angle θ3 when viewed from the sensor unit 2-L2. Similarly, angles from θ1 to θ8 can be calculated. As a result, an angle θ9 formed by the optical axis of the sensor unit 2-L1 of the sensor bar 1L and that of the sensor unit 2-R1 of the sensor bar 1R is calculated.

In other words, the relative inclinations of the sensor bars 1L and 1R can be detected. Further, even when the length of the sensor bar 1 in the longitudinal direction changes upon stretching/contraction, the relative positional relationship between the four sensor units can be acquired though the absolute distance between the sensor units 2 cannot be obtained. If the above-mentioned information about four corners representing a display size is acquired by a touch operation, coordinates in the display coordinate system can be calculated at high accuracy by only ratio-based calculation.

Figure 11:
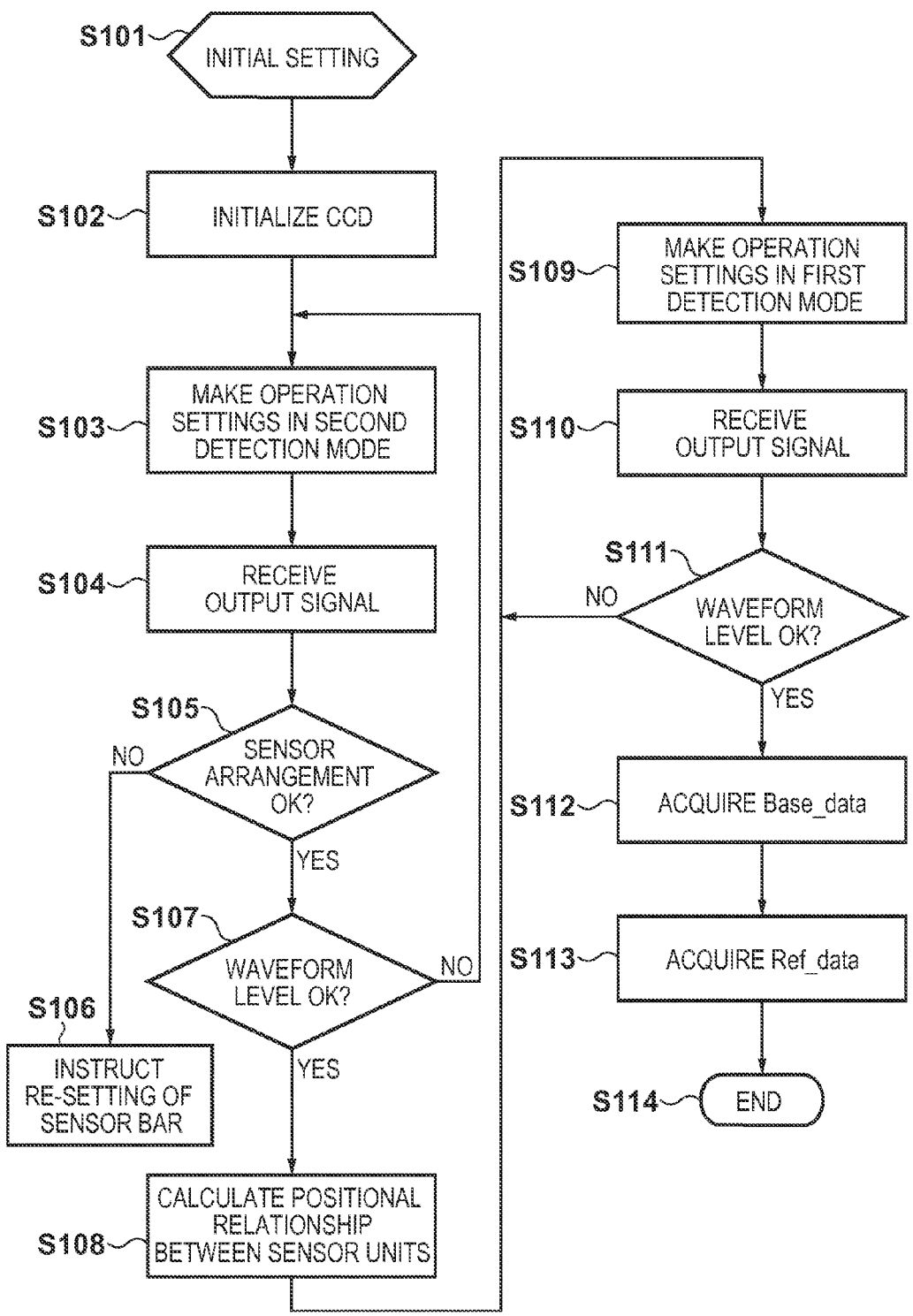
FIG. 11 is a flowchart showing initial setting processing according to the first embodiment.

FIG. 11 is a flowchart showing initial setting processing after power-on.

First, to form the rectangular effective coordinate input region 5 containing the entire display region 8 serving as a projected image, when the operator attaches the sensor bars 1 to the whiteboard 6, for example, the coordinate input apparatus is turned on and initial settings are performed (step S101).

Then, various initial settings regarding the coordinate input apparatus such as port setting of the CPU 61 and timer setting are performed. In addition, the line CCD 41 is also initialized to, for example, remove unwanted charges remaining in the photoelectric converter (step S102). A light amount to be detected by the line CCD 41 is optimized. As described above, the size of the display region 8 changes depending on the size of the whiteboard 6. Even in this case, the user appropriately sets the distance between the sensor bars 1 by stretching/contracting the sensor bars 1. Since the intensity of detected light changes depending on the attaching state, operation settings are made in the second detection mode including settings of the shutter open time of the line CCD 41 and the ON time of the infrared LED 31 or the driving current of the infrared LED 31 (step S103). Thereafter, an output signal from the line CCD 41 is received (step S104).

The operation settings in step S103 aim at deriving the relative positional relationship between the four sensor units 2 that is an operation state (the second detection mode in FIGS. 9A and 9B) in which light is directly received from the facing sensor unit 2. If the initial operation settings are made in step S103 to obtain a maximum light amount, the state in which no light has been detected in step S105 means that the sensor unit 2 at a facing position does not exist in the field range of the light receiving unit 40 of the sensor unit 2. That is, the arrangement/setting of the sensor bars 1 by the user is improper. In step S106, the user is notified of a message indicative of this, and prompted to set again the sensor bars. Upon completion of re-setting by the user, step S101 starts again. Note that signals detected in steps S105 and S106 are ones as shown in FIG. 9B. In the first embodiment, a state in which two signals are output is a normal state.

After that, the waveform of the detection signal is checked (step S107). If light from the sensor unit 2 at a facing position is excessively strong, for example, if at least part of the waveform (waveform level) of the detection signal exceeds a predetermined threshold (NO in step S107), the process returns to step S103, and settings are made again to, for example, shorten the exposure time. A detection signal waveform checked in step S107 next time should exhibit a lower light intensity. If the signal level is appropriate (YES in step S107), for example, if at least part of the detection signal waveform is equal to or lower than the predetermined threshold, the process advances to step S108. This operation is executed in the respective sensor units (four sensor units in the first embodiment). After optimizing all the signals, the relative positional relationship between the sensor units 2 is calculated (step S108).

An example of a position calculation method of each sensor unit in step S108 will be described below. First, as described earlier, θ1 to θ7 shown in FIG. 10A are calculated based on the waveform of a detection signal obtained by each sensor unit. Note that in processing of the first embodiment, θ8 is not used and therefore is not calculated.

Figure 10B:
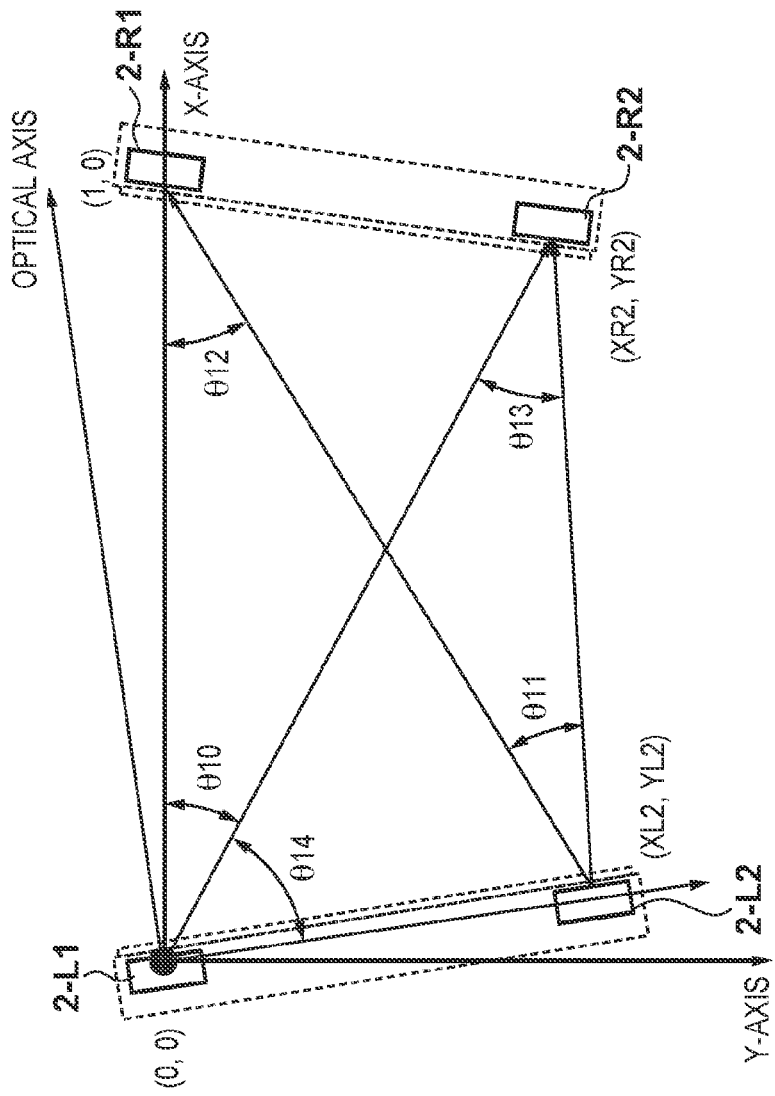
FIG. 10B is a view for explaining calculation of the relative positional relationship between the sensor units according to the first embodiment.

A direction which connects the origin to the sensor unit 2-R1 using the sensor unit 2-L1 as an origin is the X-axis, and that perpendicular to the X-axis is the Y-axis, as shown in FIG. 10B. The coordinates (X, Y) of the sensor unit 2-R1 are set to (1, 0) to define a relative coordinate system.

From the values θ1 to θ6, θ10 to θ12 shown in FIG. 10B are calculated as:

$$\theta 10 = \theta 2 - \theta 1 \quad (10)$$

$$\theta 11 = \theta 3 + \theta 4 \quad (11)$$

$$\theta 12 = \theta 6 - \theta 5 \quad (12)$$

Note that in processing of the first embodiment, θ13 is not used and therefore is not calculated. An example of another method for calculating each angle will be described herein.

From FIG. 10B, we have:

$$\theta 10 + \theta 12 = \theta 11 + \theta 13 \quad (13)$$

From equation (13), when three angles of θ10 to θ13 (second angle information, third angle information, fourth angle information, and fifth angle information) are given, the remaining angle can be calculated. Therefore, three arbitrary angles of θ10 to θ13 may be calculated, and the remaining angle may be calculated in accordance with equation (13). A method of calculating θ10, θ12, and θ13, and calculating θ11 in accordance with equation (13), for example, is available.

The angle the optical axis of the sensor unit 2-L1 makes with a line segment which connects the optical axis centers of the sensor units 2-L1 and 2-L2 to each other is π/2 [rad], as described with reference to FIG. 10A. This value is stored on a program (memory (reference angle information storage unit)) as reference angle information. The storage of the reference angle information is executed by an operation of, for example, measuring a reference angle and storing it on the program at the time of assembling an apparatus in the factory. Using this reference angle information, θ14 (first angle information) is calculated as:

$$\theta 14 = \pi/2 - \theta 2 \quad (14)$$

The coordinates of the sensor units 2-L2 and 2-R2 are calculated using θ10 to θ14. Note that as shown in FIG. 10B, letting (XL2, YL2) be the coordinates of the sensor unit 2-L2, and (XR2, YR2) be the coordinates of the sensor unit 2-R2, we have:

$$YL2 = XL2 \times \tan(\theta 10 + \theta 14) \quad (15)$$

$$YL2 = (1 - XL2) \times \tan \theta 12 \quad (16)$$

$$YR2 = XR2 \times \tan \theta 10 \quad (17)$$

$$YR2 - YL2 = (XR2 - XL2) \times \tan(\theta 11 + \theta 12) \quad (18)$$

From equations (15) and (16), we have:

$$XL2 = \tan \theta 12 / (\tan(\theta 10 + \theta 14) + \tan \theta 12) \quad (19)$$

From equations (17) and (18), we have:

$$XR2 = (YL2 - XL2 \times \tan(\theta 11 + \theta 12))/(\tan \theta 10 - \tan(\theta 11 - \theta 12)) \quad (20)$$

From equation (19), XL2 is calculated. From calculated XL2 and equation (15), YL2 is calculated.

From calculated XL2, YL2, and equation (20), XR2 is calculated. From calculated XR2 and equation (17), YR2 is calculated.

The coordinates (XL2, YL2) of the sensor unit 2-L2, and the coordinates (XR2, YR2) of the sensor unit 2-R2 are calculated in accordance with the above-mentioned procedure. Note that a coordinate value processing method of each sensor unit described herein is merely an example, and calculation may be done in accordance with another scheme or procedure, as a matter of course.

In step S109 and subsequent steps, infrared light projected by the sensor unit 2 is retroreflected by the retroreflecting member 4 mounted on the facing sensor bar 1, the retroreflected light is detected by the light receiving unit 40 of the sensor unit 2 itself, and the signal level at this time is optimized. As described above, the arrangement of the sensor bars 1 is not constant, and a detection level corresponding to the arrangement is optimized to obtain a stable signal. Operation settings are made in the first detection mode including, as items to be set, settings of the shutter open time of the line CCD 41 and the ON time of the infrared LED 31 or the driving current of the infrared LED 31 (step S109). If the initial operation settings are made in step S109 to obtain a maximum light amount, an output signal from the line CCD 41 at this time is received (step S110).

The received output signal is data in the presence of illumination, and has a waveform as shown in FIG. 6B. If light is excessively strong, it exceeds the dynamic range of the line CCD 41, the output is saturated, and it becomes difficult to calculate an accurate angle. In this case, it is determined in step S111 that the detection signal waveform is improper (NO in step S111), the process returns to step S109, and settings are made again to reduce the detection signal waveform (waveform level). Since retroreflected light is detected, it can be set to greatly increase the amount of light to be projected, compared to a case in which the light receiving unit 40 directly detects light projected by the sensor unit 2 in the processes of steps S103 to S108 (that is, the second detection mode).

If it is determined in step S111 that the waveform level is optimum (YES in step S111), a signal Base_Data[N] (see FIG. 6A) in the absence of illumination is acquired and stored in the memory 64 (step S112). Then, a signal Ref_Data[N] (see FIG. 6B) in the presence of illumination is acquired and stored in the memory 64 (step S113).

After acquiring data in all the sensor units, a series of initial setting processes is completed.

Figure 12A:
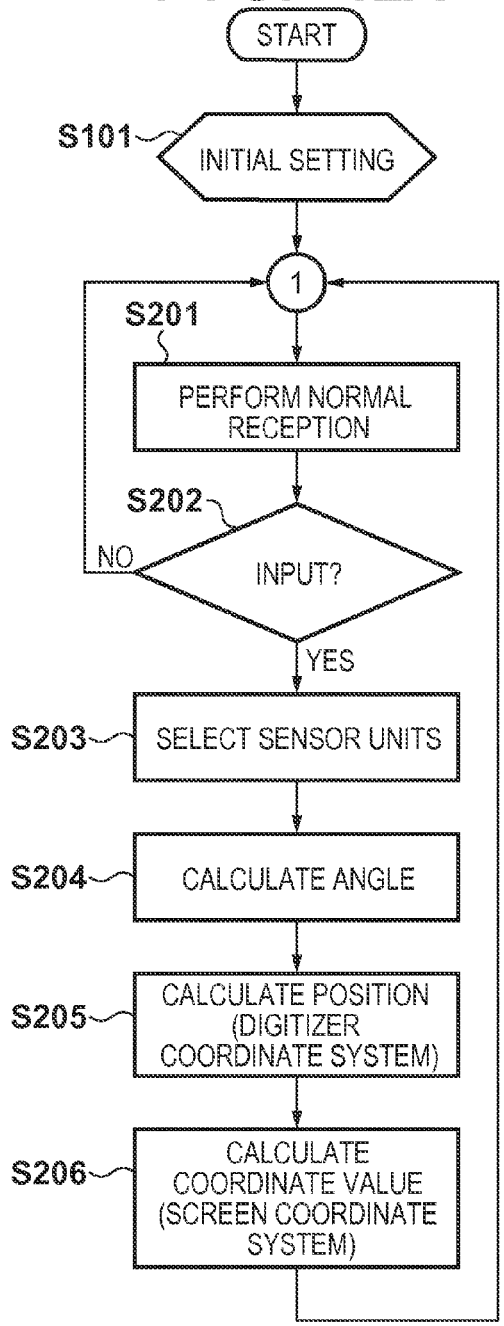
FIG. 12A is a flowchart showing a normal operation and calibration processing according to the first embodiment.

FIG. 12A is a flowchart showing a normal sampling operation after initial setting processing.

The initial setting processing in FIG. 11 is executed (step S101). Then, a signal obtained when infrared light projected by the sensor unit 2 is retroreflected by the retroreflecting member 4 mounted on the facing sensor bar 1 and the retroreflected light is detected by the light receiving unit 40 of the sensor unit 2 itself is detected as a normal reception operation (first detection mode) (step S201). The data at this time is Norm data[N]. If a touch operation is performed and cuts off the optical path, no optical signal can be detected near the pixel number Nc, as shown in FIG. 6C.

It is determined whether a light shielding portion is generated in either sensor unit 2, that is, whether input has been done (step S202). If it is determined whether no input has been done (NO in step S202), the process returns to step S201 again, and sampling is repeated. On the other hand, if it is determined whether input has been done (YES in step S202), a sensor unit having a light shielding portion generated in its output signal is selected (step S203). Each direction (angle) in which a light shielding portion is generated is calculated using the selected sensor unit (step S204).

Figure 13A:
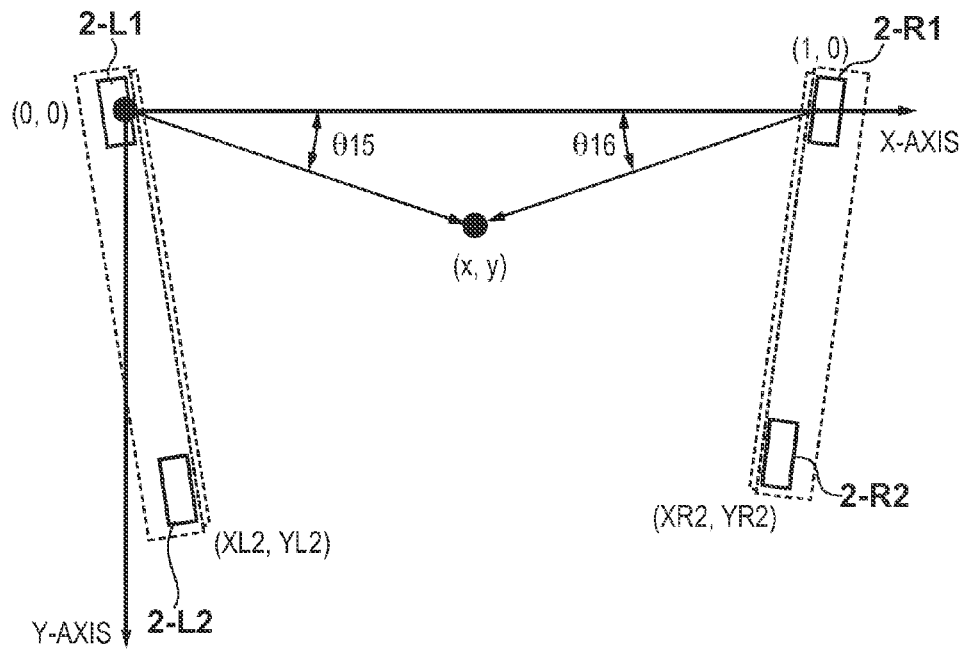
FIG. 13A is a view for explaining calculation of the relative positional relationship between the sensor units according to the first embodiment.
Figure 13B:
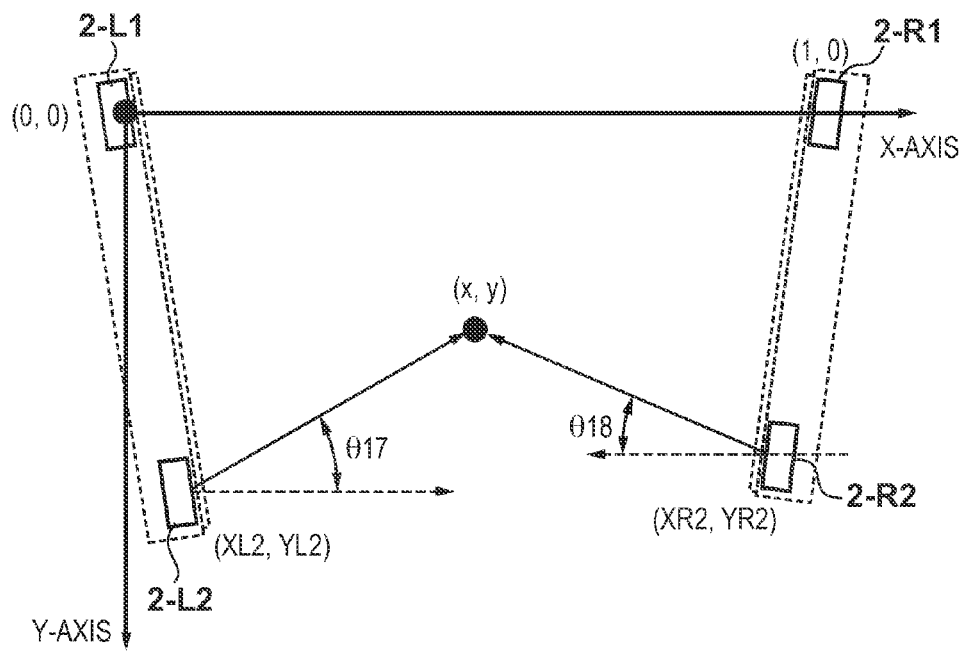
FIG. 13B is a view for explaining calculation of the relative positional relationship between the sensor units according to the first embodiment.

FIGS. 13A and 13B illustrate an example in which a light shielding portion (shadow) is generated by touching.

FIG. 13A shows the case wherein a light shielding portion is generated in a region shown in FIG. 7C. Let $\theta 15$ be the angle of the light shielding portion detected by the sensor unit 2-L1, and $\theta 16$ be the angle of the light shielding portion detected by the sensor unit 2-R1. Similarly, FIG. 13B shows the case wherein a light shielding portion is generated in a region shown in FIG. 7E. Let $\theta 17$ be the angle of the light shielding portion detected by the sensor unit 2-L2, and $\theta 18$ be the angle of the light shielding portion detected by the sensor unit 2-R2. Note that $\theta 17$ and $\theta 18$ are the angles of the sensor units with reference to a direction (a direction indicated by a dotted line) parallel to the X-axis.

When the relative coordinates of each sensor unit are calculated, directions parallel to the sensor unit 2-L2 and the X-axis are calculated as directions (angles) rotated through $\theta 12$ from those in which the sensor unit 2-R1 is detected from the sensor unit 2-L2. The same applies to the sensor unit 2-R2, and directions parallel to the X-axis are calculated as directions (angles) rotated through $\theta 10$ from those in which the sensor unit 2-L1 is detected from the sensor unit 2-R2.

Based on the calculated angles, the coordinates of the touch position in the relative coordinate system are calculated (step S205). Details are as follows.

Referring to FIG. 13A, the angle detected by the sensor unit 2-L1, and the coordinates (x, y) of the light shielding portion have a relation:

$$y = x \times \tan\theta 15 \quad (21)$$

Similarly, the angle detected by the sensor unit 2-L1, and the coordinates (x, y) of the light shielding portion have a relation:

$$y = (1-x) \times \tan\theta 16 \quad (22)$$

Again, referring to FIG. 13B, the angle detected by the sensor unit 2-L2, and the coordinates of the light shielding portion have a relation:

$$YL2 - y = (x - XL2) \times \tan\theta 17 \quad (23)$$

Also, the angle detected by the sensor unit 2-R2, and the coordinates of the light shielding portion have a relation:

$$YR2 - y = (XR2 - x) \times \tan\theta 18 \quad (24)$$

Note that the combination of sensor units which detect light shielding portions vary in four regions, as described with reference to FIGS. 7A to 7F.

First, in the region shown in FIG. 7B, light shielding portions are detected by the sensor units 2-L1 and 2-L2. From equation (21) established by the sensor unit 2-L1, and equation (23) established by the sensor unit 2-L2, we have:

$$x = (YL2 + XL2 \times \tan\theta 17)/(\tan\theta 15 + \tan\theta 17) \quad (25)$$

From equation (25), x is calculated. From calculated x and equation (21), y is calculated.

In the region shown in FIG. 7C, light shielding portions are detected by the sensor units 2-L1 and 2-R1. From equation (22) established by the sensor unit 2-L1, and equation (24) established by the sensor unit 2-R1, we have:

$$x = \tan\theta 16/(\tan\theta 15 + \tan\theta 16) \quad (26)$$

From equation (26), x is calculated. From calculated x and equation (21), y is calculated.

In the region shown in FIG. 7D as well, from equation (21) established by the sensor unit 2-L1, and equation (22) established by the sensor unit 2-R1, we have:

$$x = (\tan\theta 16 + XR2 \times \tan\theta 18 - YR2)/(\tan\theta 16 + \tan\theta 18) \quad (27)$$

From equation (27), x is calculated. From calculated x and equation (22), y is calculated.

In the region shown in FIG. 7E as well, from equation (23) established by the sensor unit 2-L2, and equation (24) established by the sensor unit 2-R2, we have:

$$x = (XL2 \times \tan\theta 17 + XR2 \times \tan\theta 18 + YL2 - YR2)/(\tan\theta 17 + \tan\theta 18) \quad (28)$$

From equation (28), x is calculated. From calculated x and equation (23), y is calculated.

The coordinates (x, y) of the touch position are calculated in this manner.

The coordinates of the calculated touch position are converted into those of a display coordinate system, and the coordinate values are output (transmitted) to the external device of a personal computer (step S206).

At this time, a touch-down signal/touch-up signal representing whether the input surface remains touched may be output together. In a coordinate input apparatus of this type, the optical path is completely cut off by touching the touch screen. However, when the touch state is gradually canceled, light passes gradually. Thus, by calculating the degree at which light is cut off, whether the touch screen remains touched, or the touch screen is not touched but the optical path is cut off (the angle can be calculated, and even in this case, the position can be calculated) can be determined by setting a threshold.

Figure 12B:
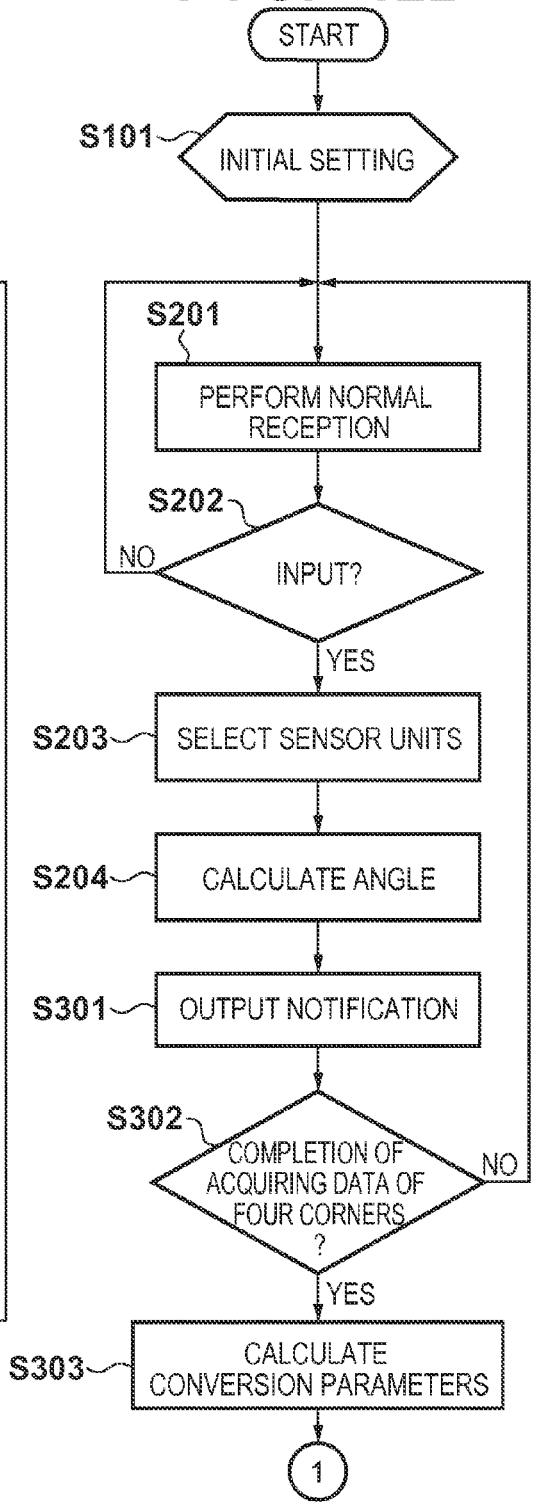
FIG. 12B is a flowchart showing a normal operation and calibration processing according to the first embodiment.

The switching unit such as a switch is operated to shift to the calibration mode (second detection mode) in which the relative coordinate system and display coordinate system are made to coincide with each other. A sequence in the calibration mode will be explained with reference to FIG. 12B.

The calibration mode is executed immediately after the sensor bars 1 are attached, or when the display position of the display changes accidentally even upon completion of installation. After the transition to the calibration mode, initial setting processing is performed (step S101). In this case, an optical output is optimized and misalignment of the sensors is corrected on the assumption that the setting state of the sensor bars changes during use.

To prompt the user to perform a touch operation at the four corners of the display region 8, it is determined through steps S201 and S202 whether the user has touched one of these positions. In step S203 and S204, necessary angle information is calculated. Thereafter, the user is notified of the completion of data acquisition (step S301). As this notification, for example, a beep sound may be output to represent the completion.

Then, it is determined whether acquisition of information about all the four corners of the display region 8 is completed (step S302). If the acquisition is not completed (NO in step S302), the process returns to step S201. If the acquisition is completed (YES in step S302), parameters for conversion from the relative coordinate system into the display coordinate system are calculated (step S303). The process then returns to the normal operation. The calculated parameters are used in coordinate conversion in step S206.

Note that an effective coordinate input region 5 in which a touch is effective is determined in advance, as shown in FIG. 3A. In a portion which falls outside the effective coordinate input region 5 upwards, and a portion which falls outside it downwards, the values of θ15 to θ18 come close to zero in FIGS. 13A and 13B, so the error of the calculated coordinates increases. The degree of error is mainly determined by factors of, for example, the angular resolution or noise of the sensor, but the range of the effective coordinate input region 5 is determined in consideration of the tolerance of the error.

With the above-mentioned calibration processing, the position of the display screen relative to the installation position of the apparatus can be associated with each other, so it can be checked whether the display screen falls within the effective range of the apparatus. When, for example, it is determined that the display screen falls outside the effective range as a result of inspection of the effective range, processing of sending a notification which prompts the user to re-adjust a display screen by, for example, a beep sound and audio may be performed.

Alternatively, a method of operating, in advance, driver software for performing screen adjustment on the connected PC is available. In this method, if it is determined that the display screen falls outside the effective range by calibration processing, information indicating the amount of shift of the display screen with respect to the effective range is transmitted to the driver software. The driver software can receive this information to automatically adjust the display screen.

As described above, according to the first embodiment, even if the distance between the sensor units is unknown, it is possible to provide a coordinate input apparatus which can control a display screen by touching a projection surface formed by an existing whiteboard or the wall surface of, for example, a meeting room with an inexpensive arrangement. That is, a coordinate input apparatus can be provided with a less expensive arrangement.

<Second Embodiment>

Although a coordinate input apparatus including two sensor bars 1 which incorporate two sensor units 2 is used in the first embodiment, the present invention is not limited to this. The principle described in the first embodiment is also applicable to, for example, a coordinate input apparatus including two sensor units 2.

Figure 14:
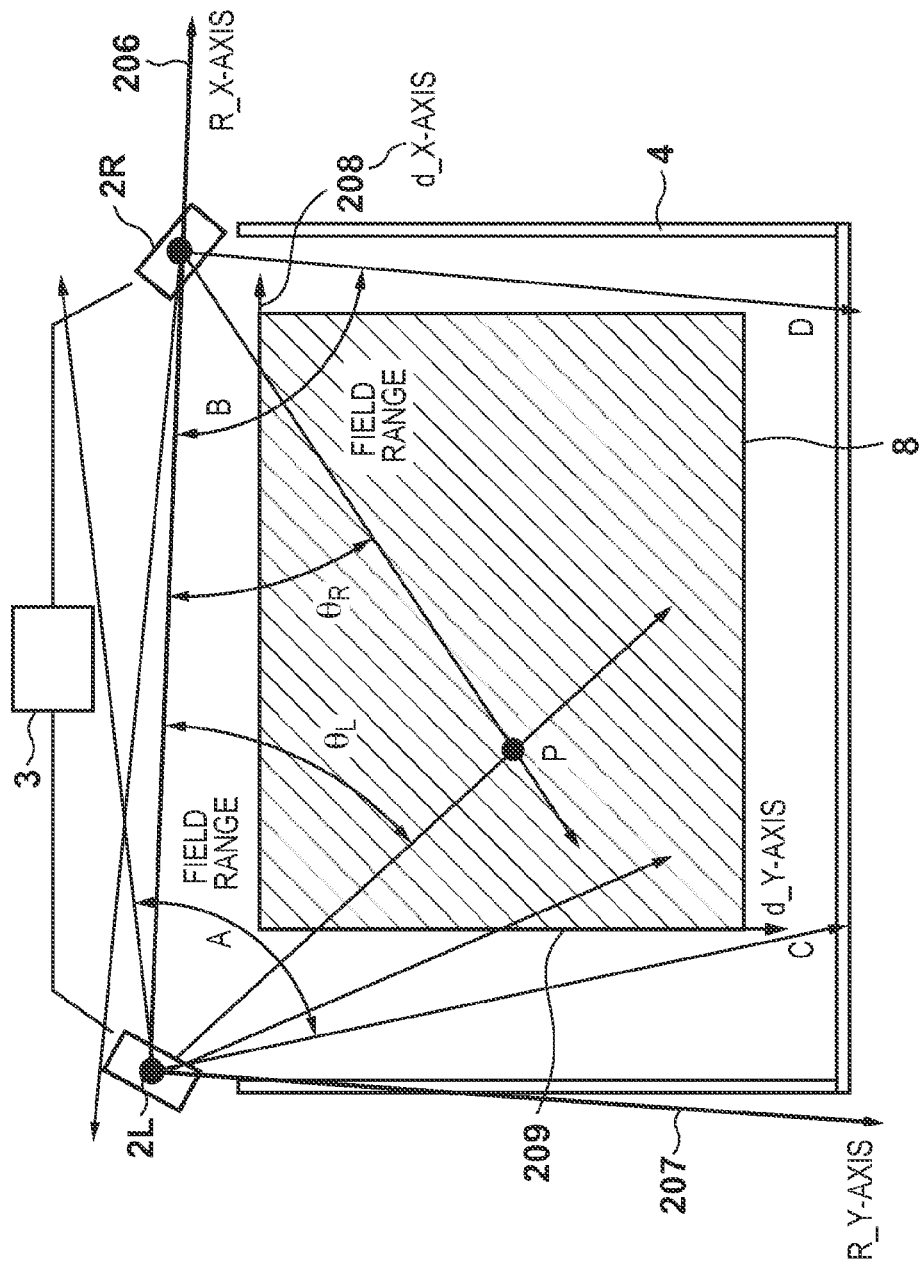
FIG. 14 is a view showing the schematic arrangement of a coordinate input apparatus according to the second embodiment.

FIG. 14 is a view showing the schematic arrangement of a coordinate input apparatus according to the second embodiment.

Referring to FIG. 14, reference numeral 2 denotes a sensor unit serving as an angle detection sensor unit; 3, an arithmetic control circuit; and 4, a retroreflecting member, so these arrangements are the same as in the first embodiment, and a description thereof will not be given. Also, reference numeral 8 denotes a display region, which is appropriately set within the field range of the two sensor units 2 by the user.

Note that sensor units 2L and 2R are set by the user, and a distance dh between the sensor units 2L and 2R is unknown. The field range of the sensor unit 2L includes the sensor unit 2R, and the sensor unit 2L is similarly positioned within the field range of the sensor unit 2R. Therefore, a light receiving unit 40 of the sensor unit 2L serving as a sensor unit light emission position detection unit receives light emitted by a light projecting unit 30 of the sensor unit 2R with respect to the sensor unit 2L to detect the direction of the sensor unit 2R. The arithmetic control circuit 3 serving as a sensor relative position calculation unit defines a line segment, which connects the sensor units 2L and 2R to each other, as an R_X axis 206 of the relative coordinate system of the coordinate input apparatus, and defines a direction normal to it as an R_Y axis 207. Then, for example, a relative coordinate system is determined by setting the coordinates of the sensor unit 2L as the origin (0, 0), and the coordinates of the sensor unit 2R as (1, 0).

If a point P within the display region is touched, the angles θL and θR it makes with the R_X axis 206 of the relative coordinate system can be detected. Therefore, the arithmetic control circuit 3 can calculate the coordinates of the touch position P in the relative coordinate system of the coordinate input apparatus using the distance between the sensor units 2L and 2R as a reference distance.

Referring to FIG. 14, reference numeral 8 denotes the display region of the display, and a display coordinate system is defined to have a d_X axis 208 in the horizontal direction, and a d_Y axis 209 in the vertical direction. When the user touches, for example, at least three of four corners A to D of the display region 8, the arithmetic control circuit 3 serving as a relative coordinate calculation unit calculates the relative position coordinates of the touch position P in the relative display coordinate system, and stores this information in a memory 64. Based on the values stored in the memory 64, the arithmetic control circuit 3 also serving as a coordinate value conversion unit can convert the relative coordinate values of the touch position P into those of the display coordinate system.

As described above, according to the second embodiment, even if the distance between the sensor units 2L and 2R is unknown, a cursor, for example, can be accurately displayed at the touch position P. Also, in the arrangement of the second embodiment, relative to the arrangement of the first embodiment, a sensor bar itself is unnecessary, and the number of sensor units used can be decreased, thus providing a coordinate input apparatus with a less expensive arrangement.

<Third Embodiment>

In the first embodiment, as described with reference to FIG. 10A, the angle that the optical axis of a sensor unit 2-L1 makes with a line segment which connects the optical axis center of the sensor unit 2-L1 and that of a sensor unit 2-L2 is fixed to π/2 [rad]. This value is stored as reference angle information, and θ14 in FIG. 10B is calculated using the reference angle information, as presented in equation (14).

An example in which processing is performed without reference angle information will be described in the third embodiment. In the third embodiment, referring to FIG. 10B, light emission of an infrared LED 31 in the sensor unit 2-L2 is designed to make a light receiving unit 40 in the sensor unit 2-L1 receive light. In practice, the design of an optical system including the light projecting unit 30 of the sensor unit 2-L2, and the light receiving unit 40 of the sensor unit 2-L1 is changed. Also, an optical path which passes the housing interior from the sensor unit 2-L2 to the sensor unit 2-L1 is ensured to design the housing so as not to shield the optical path by, for example, stretching/contraction of the sensor bar.

The sequence of processing is the same as in the first embodiment. In waveform acquisition in step S104 of FIG. 11, light emitted by the infrared LED 31 in the sensor unit 2-L2 is received by the light receiving unit 40 in the sensor unit 2-L1 to detect the direction from the sensor unit 2-L1 to the sensor unit 2-L2. Based on the detected direction, $\theta 14$ in FIG. 10B can be calculated. The procedure of subsequent processing is the same as in the first embodiment, and a description thereof will not be given.

As described above, according to the third embodiment, in addition to the effect described in the first embodiment, there is no need to store reference angle information in advance, thus obviating the need for an operation of measuring and storing the reference angle.

<Fourth Embodiment>

Although a coordinate input apparatus including two sensor bars 1 which incorporate two sensor units 2 is used in the first or second embodiment, the present invention is not limited to this. For example, each sensor unit 2 and the retroreflecting member 4 may have different arrangements.

Figure 15:
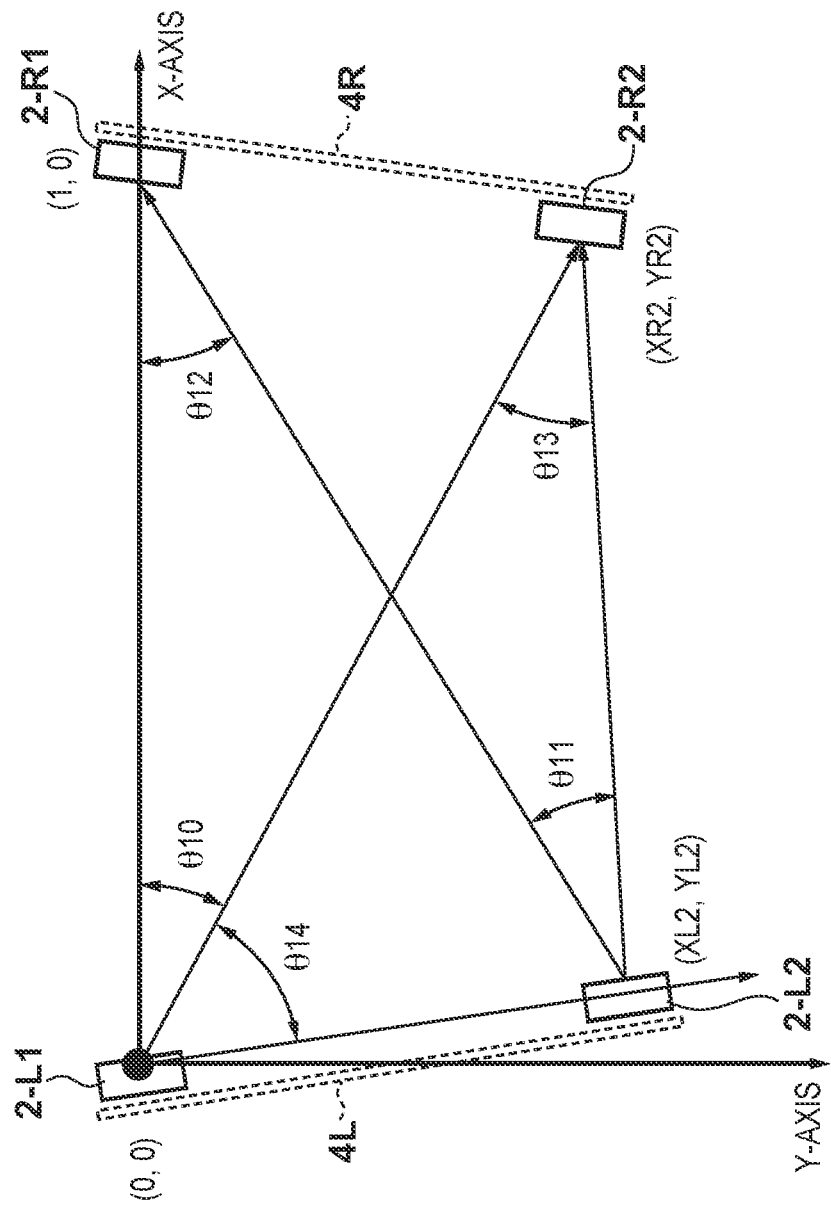
FIG. 15 is a view for explaining coordinate calculation processing according to the fourth embodiment.
Figure 16:
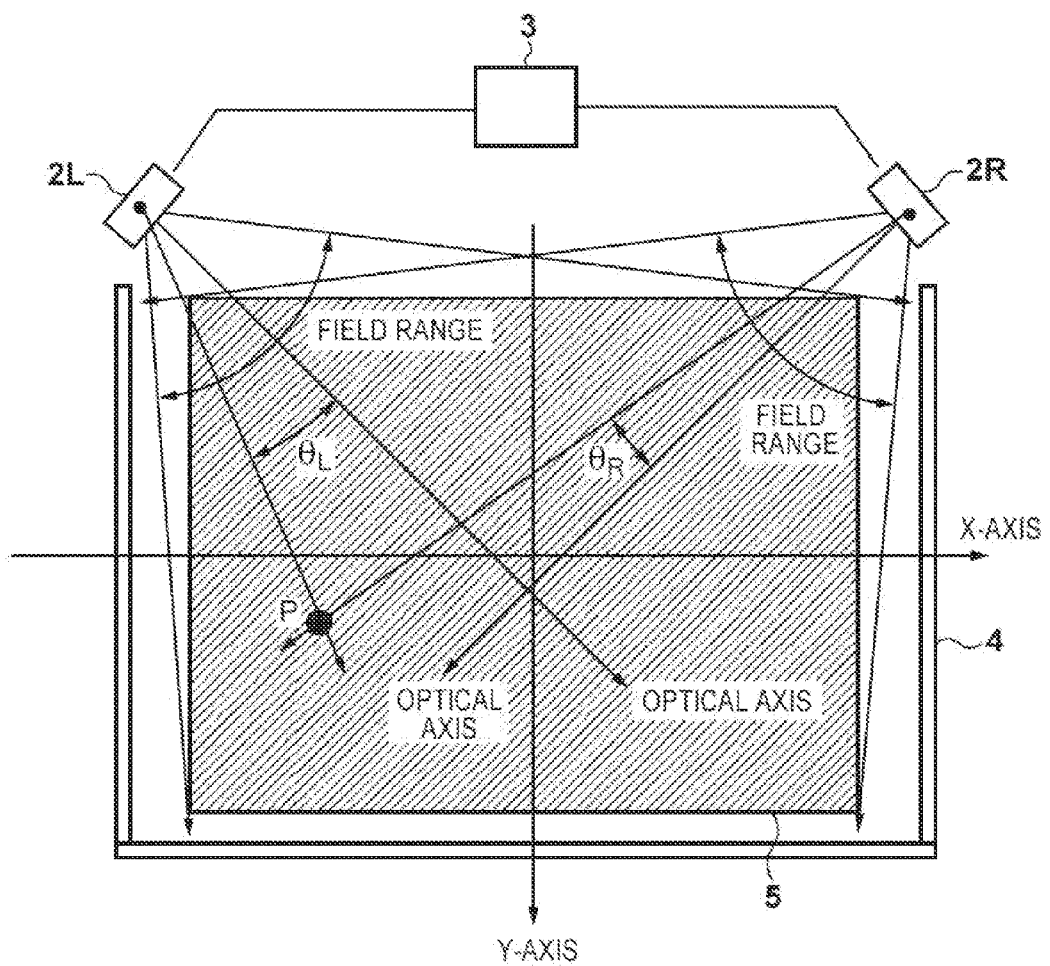
FIG. 16 is a view for explaining the basic arrangement of a conventional optical coordinate input apparatus.

As shown in FIG. 15, four sensor units 2-L1, 2-L2, 2-R1, and 2-R2 are set around an effective coordinate input region 5, and retroreflecting members 4L and 4R are set to be positioned between the respective sensor units. Even with such an apparatus arrangement, the principle described in the first embodiment can be adopted. Note that the sequence of processing is the same as in the third embodiment, and a description thereof will not be given.

<<Characteristic Arrangement and Effect of Present Invention>>

As described above, the present invention relates to a coordinate input apparatus which calculates the coordinates of a designated position in an almost rectangular coordinate input effective region, and includes at least two sensor units each including a light projecting unit and light receiving unit. Also, the sensor unit which functions as a sensor unit light emitting position detection unit detects light emitted by the light projecting unit of the other sensor unit. An arithmetic control circuit which functions as a sensor unit relative position calculation unit calculates the relative positional relationship between the sensor units in accordance with the angle information detected by the sensor unit light emitting position detection unit.

The arithmetic control circuit which also functions as a relative coordinate calculation unit calculates the relative coordinates of the touch position based on the angle detected by each sensor unit based on the positional relationship between the sensor units, which is specified by the sensor unit light emitting position detection unit. Note that the relative coordinates mean a position relative to the normalized distance between the sensor units.

Further, for example, the arithmetic control circuit includes a display information storage unit which stores the relative coordinate values of each touch position when the user touches at least three of the four corners of the display region. The arithmetic control circuit which also functions as a coordinate value conversion unit can convert relative coordinate values calculated by the relative coordinate calculation unit into those of the display coordinate system based on the values stored by the display information storage unit.

A coordinate input apparatus which calculates the coordinates of a designated position in an almost rectangular coordinate input effective region including two sensor units will be described in more detail.

To measure the positional relationship between the sensor units, the sensor unit light emitting position detection unit detects light emitted by the light projecting unit of the other sensor unit. With this operation, the position of the other sensor unit can be measured in one direction (absolute angle) from one sensor unit. An arithmetic control circuit which functions as a relative coordinate system generation unit defines an X-Y plane having an X-axis in the direction of a line segment that connects the two sensor units to each other, and a Y-axis in a direction perpendicular to the line segment. Moreover, the relative coordinate system of the coordinate input apparatus is defined using an unknown distance between the two sensor units as a reference distance (normalization). The relative coordinate calculation unit can calculate the relative coordinates of a touch position on the X-Y plane of the coordinate input apparatus defined by the relative coordinate system generation unit.

Further, the arithmetic control circuit includes a display information storage unit which stores the relative coordinate values of each touch position output from the relative coordinate calculation unit when the user touches, for example, at least three of the four corners of the display region. The arithmetic control circuit which functions as a coordinate value conversion unit can convert the relative coordinate values calculated by the relative coordinate calculation unit into those of the display coordinate system based on the values stored in the display information storage unit.

With such an arrangement, a cursor, for example, can be displayed upon defining the touched position as its echo back to use an input-output apparatus. In other words, even when the distance information between the two sensor units when they are set by the user is unknown, a touch position can be accurately calculated in the display coordinate system.

Also, a coordinate input apparatus which calculates the coordinates of a designated position in an almost rectangular coordinate input effective region includes first and second housings (sensor bars) that incorporate at least two sensor units. Sensor units are set at the positions of the two end portions of the first and second housings, and the distance between the two sensor units is set variable by a stretching/contraction mechanism set in the housings. By stretching/contracting the housings in this way, the housings can be set by appropriately adjusting their lengths in accordance with the size of the display screen, or that of the setting surface as the display screen. Note that the first and second housings are arranged on two facing sides of the almost rectangular effective coordinate input region.

Moreover, a retroreflecting member for returning incident light to the incoming direction is arranged in each housing. The sensor unit arranged in each housing includes a light projecting unit which projects an infrared ray toward the retroreflecting member of the housing arranged on a facing side, and a light receiving unit which receives light retroreflected by the retroreflecting member. When a touch in the effective coordinate input region cuts off the optical path of light emitted by one of the sensor units, the sensor units can detect directions, corresponding to the touch position, in which light is cut off.

The first and second housings include attaching/detaching units (height adjustment units) capable of attachment and detachment to and from a screen surface serving as a coordinate input surface so that the first and second housings can be carried.

Considering the carriage, the first and second housings are desirably configured to be more compact and lighter weight. The light receiving optical system of the sensor unit according to the present invention has a predetermined field range (about 50°). Although the optical axis of the light receiving optical system is set in the normal direction of the pixel of a photoelectric converter, the field range is set to be asymmetric about the optical axis, and the sensor unit includes an optical system asymmetric about the optical axis. The optical axis (or the normal direction of the pixel of the photoelectric converter) is set to be perpendicular to a straight line connecting at least two sensor units (the centers of the optical axes of the light receiving optical systems) stored in the housing. This arrangement can further downsize the housing storing the sensor units.

Screen surfaces are assumed to have various sizes or aspect ratios, and the effective coordinate input region is set in accordance with the size and shape of the screen surface. For this purpose, each of the first and second housings includes a stretching/contraction unit (stretching/contraction mechanism). By adjusting the stretching/contraction amount, the distance between the sensor units arranged in the housing changes, and the sensor units can be appropriately arranged in accordance with the size of the screen surface. Further, the first and second housings are set on two sides facing the almost rectangular screen surface (coordinate input effective region) in accordance with the size or aspect ratio of the screen surface.

When attaching the first and second housings including the sensor units, even if their relative positions are not precisely determined, a touch position can be detected at high accuracy. Detection units which detect relative positional information between the sensor units stored in the respective housings upon attaching the housings are arranged, and allow the user to easily attach the housings without being conscious of their relative positions.

If no dedicated driver software need be installed in a personal computer or the like which receives information output from the coordinate input apparatus, the user can use the coordinate input apparatus immediately upon connecting it to an arbitrary personal computer or the like. Work (calibration) to make the coordinate system (relative coordinate system) of the coordinate input apparatus and the coordinate system (display coordinate system) of the display apparatus coincide with each other can be executed without the mediacy of the personal computer.

The main part of the present invention in the coordinate input apparatus is as follows.

A coordinate input apparatus: at least two sensor units each of which includes a light projecting unit configured to project light toward the coordinate input effective region, and a light receiving unit configured to receive incoming light; a detection unit configured to detect angle information indicating a direction in which one sensor unit of the at least two sensor units is positioned, by directly receiving light from the light projecting unit of the other sensor unit at the light receiving unit of the one sensor unit; and a coordinate calculation unit configured to calculate coordinate values of the designated position based on the angle information detected by the detection unit.

As described above, according to the present invention, the following effect can be obtained.

A sensor unit necessary to detect a touch position can be set on the screen surface as the coordinate input surface by the user to display a cursor as its echo back at, for example, the touch position. In other words, a sensor unit can be attached to an existing whiteboard or flat wall surface to project a screen on it, thereby achieving an interactive display. As seen from the user, an existing display apparatus (for example, a front projector) owned by the user can be sophisticated in function at a low cost (provision of an interactive function that can be operated by directly touching the screen). Further, when only a sensor unit and a circuit group which controls it are carried, an excellent effect which achieves an operation environment at the carry destination can also be obtained.

Conventionally, in an optical coordinate input apparatus of this type, sensor units must be attached at predetermined positions with high accuracy, so the distance between the sensor units must be known.

However, according to the present invention, even when the distance between the sensor units is unknown, a cursor can be displayed at a touch position on the display with high accuracy. Therefore, when the sensor units are assumed to be attached by the user, a distance measurement function between the sensor units is unnecessary, so the coordinate input apparatus is significantly advantageous in terms of cost. Moreover, the trouble to attach the sensor units at predetermined positions by the user with high accuracy can be saved, thus obtaining an excellent effect of providing a convenient apparatus.

Also, all building components necessary to detect a touch position are stored in two housings, and a touch position can be detected by attaching the housings to, for example, a flat whiteboard or wall surface. That is, the coordinate input apparatus according to the present invention does not have, as indispensable building components, a touch input surface as a coordinate input effective region. Therefore, even if the coordinate input effective region is large (for example, around 90 inches), an operation environment can be achieved everywhere by carrying only the two housings. Moreover, since a touch input surface is not provided as a building component, the product cost can be considerably reduced, as a matter of course. In other words, a significant effect of lowering the introduction cost can be obtained by utilizing, for example, an existing whiteboard owned by the user.

Storing all the building components in the two housings gives an effect of easy attachment, wiring, and the like to the whiteboard by the user. Considering carriage, the housings are made more compact and lighter, and the light receiving optical system of the sensor unit is set to be asymmetric about the optical axis. Accordingly, more compact and lighter housings can be realized, improving portability.

For example, considering attachment to an existing whiteboard, the size of the whiteboard varies depending on the manufacturer, product model number, and the like. If the coordinate input apparatus can be used by utilizing a whiteboard which has already been purchased and used by the user, this leads to reduction of the introduction cost or effective use of the resources.

In the coordinate input apparatus capable of high-accuracy position detection, the housings can be attached at rough accuracy, greatly reducing cumbersome installation and shortening the installation time.

For example, assume that an environment is built, where the coordinate input apparatus formed from the two housings is carried into a meeting room where a whiteboard, personal computer, and front projector have already been introduced, and the screen is directly touched and operated.

At this time, the personal computer already introduced in the meeting room is quickly set usable without installing a driver or the like for operating the coordinate input apparatus, thereby improving installation easiness and portability. That is, a dedicated personal computer in which the driver or the like has already been installed need not be carried together with the coordinate input apparatus. Since installation work to the personal computer in the meeting room is unnecessary, a meeting can be quickly started without any unwanted setup time.

Embodiments of the present invention can also be realized by a computer of a system or apparatus that reads out and executes computer executable instructions recorded on a storage medium (for example, non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blue-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-192299, filed Aug. 31, 2012, which is hereby incorporated by reference herein in its entirety.

What is claimed is:

1. A coordinate input apparatus comprising:
   first, second, third and fourth sensor units disposed corresponding to four corners of a coordinate input region and each comprising a light projecting unit configured to project light toward the coordinate input region, and a light receiving unit configured to receive incoming light, and the first and second sensor units are set to a first retroreflecting unit, the third and fourth sensor units are set to a second retroreflecting unit, and the first and second retroreflecting units are disposed corresponding to two sides of the coordinate input region;
   a determination unit configured to detect first angle information between a direction corresponding to the third sensor unit detected by the first sensor unit and a direction from the second sensor unit to the first sensor unit disposed corresponding to a first corner of the coordinate input region, to detect at least three pieces of angle information in second angle information between the direction corresponding to the third sensor unit detected by the first sensor unit and a direction corresponding to the fourth sensor unit detected by the first sensor unit disposed corresponding to the first corner of the coordinate input region, third angle information between a direction corresponding to the third sensor unit detected by the second sensor unit and a direction corresponding to the fourth sensor unit detected by the second sensor unit, fourth angle information between a direction corresponding to the first sensor unit detected by the third sensor unit and a direction corresponding to the second sensor unit detected by the third sensor unit disposed corresponding to a third corner of the coordinate input region, and fifth angle information between a direction corresponding to the first sensor unit detected by the fourth sensor unit and a direction corresponding to the second sensor unit detected by the fourth sensor unit disposed corresponding to a fourth corner of the coordinate input region, by directly receiving light from the light projecting unit of one sensor unit at the light receiving unit of the other sensor unit, and to determine a positional relationship among the first, second, third and fourth sensor units in accordance with the first angle information and the at least three pieces of angle information in the second, third, fourth and fifth angle information; and
   a coordinate calculation unit configured to calculate coordinate values of a designated position based on the position relationship determined by the determination unit.

2. The apparatus according to claim 1, wherein the determination unit detects angle information indicating a direction in which the one sensor unit is positioned, based on a light amount distribution obtained when the light is directly received by the light receiving unit of the other sensor unit from the light projecting unit of the one sensor unit.

3. The apparatus according to claim 1, wherein the coordinate calculation unit calculates coordinate values of the designated position by calculating relative coordinate values of the designated position based on the positional relationship and a light shielding portion detected from a light amount distribution detected by the light receiving units.

4. The apparatus according to claim 1, further comprising a storage unit configured to store relative coordinate values of a plurality of known positions in a display coordinate system of a display region, calculated by the coordinate calculation unit, in accordance with the angle information detected by the determination unit in accordance with designation of the plurality of known positions in the display coordinate system of the display region, and
   wherein the coordinate calculation unit converts the relative coordinate values of the designated position into coordinate values of the display coordinate system, based on the relative coordinate values stored in the storage unit.

5. The apparatus according to claim 1, further comprising a position change unit configured to change positions of the sensor unit and the retroreflecting unit.

6. The apparatus according to claim 1, wherein
   the first sensor unit and the second sensor unit are set at positions of two end portions of a first housing including a stretching/contraction mechanism and the first retroreflecting unit, and
   the third sensor unit and the fourth sensor unit are set at positions of two end portions of a second housing including a stretching/contraction mechanism and the second retroreflecting unit.

7. The apparatus according to claim 1, further comprising a reference angle information storage unit configured to store reference angle information, and
   wherein the determination unit detect the first angle information between the direction corresponding to the third sensor unit and the direction from the second sensor unit to the first sensor unit based on the reference angle information and the direction corresponding to the third sensor unit.

8. The apparatus according to claim 1, wherein
   the determination unit detects the first angle information between the direction corresponding to the third sensor unit and the direction corresponding to the second sensor unit detected by the first sensor unit by directly receiving light from the light projecting unit of the third sensor unit at the light receiving unit of the first sensor unit and by directly receiving light from the light projecting unit of the second sensor unit at the light receiving unit of the first sensor unit.

9. A method of controlling a coordinate input apparatus comprising first, second, third, and fourth sensor units disposed corresponding to four corners of a coordinate input region and each comprising a light projecting unit configured to project light toward the coordinate input region, and a light receiving unit configured to receive incoming light, and the first and second sensor units are set to a first retroreflecting unit, the third and fourth sensor units are set to a second retroreflecting unit, and the first and second retroreflecting units are disposed corresponding to two sides of the coordinate input region, the method comprising:

detecting first angle information between a direction corresponding to the third sensor unit detected by the first sensor unit and a direction from the second sensor unit to the first sensor unit disposed corresponding to a first corner of the coordinate input region;

detecting at least three pieces of angle information in second angle information between the direction corresponding to the third sensor unit detected by the first sensor unit and a direction corresponding to the fourth sensor unit detected by the first sensor unit disposed corresponding to a first corner of a coordinate input region, third angle information between a direction corresponding to the third sensor unit detected by the second sensor unit and a direction corresponding to the fourth sensor unit detected by the second sensor unit disposed corresponding to a second corner of a coordinate input region, fourth angle information between a direction corresponding to the first sensor unit detected by the third sensor unit and a direction corresponding to the second sensor unit detected by the third sensor unit disposed corresponding to a third corner of a coordinate input region, and fifth angle information between a direction corresponding to the first sensor unit detected by the fourth sensor unit and a direction corresponding to the second sensor unit detected by the fourth sensor unit disposed corresponding to a fourth corner of the coordinate input region, by directly receiving light from the light projecting unit of the one sensor unit at the light receiving unit of the other sensor unit determining a positional relationship among the first, second, third and fourth sensor units in accordance with the first angle information and the at least three pieces of angle information in the second, third, fourth and fifth angle information; and a coordinate calculation step of calculating coordinate values of the designated position based on the determined positional relationship.

10. The method according to claim 9, wherein
the first angle information between the direction corresponding to the third sensor unit and the direction from the second sensor unit to the first sensor unit is detected based on the reference angle information stored in a memory and the direction corresponding to the third sensor unit.

11. The method according to claim 9, wherein
the first angle information between the direction corresponding to the third sensor unit and the direction corresponding to the second sensor unit detected by the first sensor unit is detected by directly receiving light from the light projecting unit of the third sensor unit at the light receiving unit of the first sensor unit and by directly receiving light from the light projecting unit of the second sensor unit at the light receiving unit of the first sensor unit.

12. A computer-readable storage medium storing a program for causing a computer to function to control a coordinate input apparatus comprising first, second, third and fourth sensor units disposed corresponding to four corners of a coordinate input region and each comprising a light projecting unit configured to project light toward the coordinate input region, and a light receiving unit configured to receive incoming light and the first and second sensor units are set to a first retroreflecting unit, the third and fourth sensor units are set to a second retroreflecting unit and the first and second retroreflecting units are disposed corresponding to two sides of the coordinate input region, the medium storing a program for causing the computer to detect first angle information between a direction corresponding to the third sensor unit detected by the first sensor unit and a direction from the second sensor unit to the first sensor unit disposed corresponding to a first corner of a coordinate input region;

detect at least three pieces of angle information in second angle information between the direction corresponding to the third sensor unit detected by the first sensor unit and a direction corresponding to the fourth sensor unit detected by the first sensor unit disposed corresponding to the first corner of a coordinate input region, third angle information between a direction corresponding to the third sensor unit detected by the second sensor unit and a direction corresponding to the fourth sensor unit detected by the second sensor unit disposed corresponding to a second corner of a coordinate input region, fourth angle information between a direction corresponding to the first sensor unit detected by the third sensor unit and a direction corresponding to the second sensor unit detected by the third sensor unit disposed corresponding to a third corner of a coordinate input region, and fifth angle information between a direction corresponding to the first sensor unit detected by the fourth sensor unit and a direction corresponding to the second sensor unit detected by the fourth sensor unit disposed corresponding to a fourth corner of a coordinate input region and, by directly receiving light from the light projecting unit of one sensor unit at the light receiving unit of the other sensor unit;

determine a positional relationship among the first, second, third and fourth sensor units in accordance with the first angle information and the at least three pieces of angle information in the second, third, fourth and fifth angle information; and a coordinate calculation unit configured to calculate coordinate values of the designated position based on the determined positional relationship.

13. The storage medium according to claim 12, wherein
the first angle information between the direction corresponding to the third sensor unit and the direction from the second sensor unit to the first sensor unit is detected based on the reference angle information stored in a memory and the direction corresponding to the third sensor unit.

14. The storage medium according to claim 12, wherein
the first angle information between the direction corresponding to the third sensor unit and the direction corresponding to the second sensor unit detected by the first sensor unit is detected by directly receiving light from the light projecting unit of the third sensor unit at the light receiving unit of the first sensor unit and by directly receiving light from the light projecting unit of the second sensor unit at the light receiving unit of the first sensor unit.

\* \* \* \* \*